United States Patent
Alam et al.

(10) Patent No.: US 11,782,592 B2
(45) Date of Patent: Oct. 10, 2023

(54) METHOD AND APPARATUS FOR MANAGING DISPLAY OF READABLE DATA PRESENTED IN A PORTION OF A DISPLAY

(71) Applicant: Samsung Electronics Co., Ltd., Suwon-si (KR)

(72) Inventors: Arshiyan Alam, Patna (IN); Abhinav Pachauri, Kanpur (IN); Pankaj Gupta, Punjab (IN); Nitin Barthwal, Delhi (IN); Ravindra Jain, Greater Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/617,477

(22) PCT Filed: Jun. 18, 2020

(86) PCT No.: PCT/KR2020/007882
§ 371 (c)(1),
(2) Date: Dec. 8, 2021

(87) PCT Pub. No.: WO2020/256424
PCT Pub. Date: Dec. 24, 2020

(65) Prior Publication Data
US 2022/0236845 A1    Jul. 28, 2022

(30) Foreign Application Priority Data
Jun. 18, 2019   (IN) .............................. 201941024170

(51) Int. Cl.
*G06F 3/0485* (2022.01)
*G06F 40/106* (2020.01)
(Continued)

(52) U.S. Cl.
CPC .......... *G06F 3/0485* (2013.01); *G06F 3/0481* (2013.01); *G06F 40/106* (2020.01); *G06N 5/022* (2013.01); *G06F 3/04883* (2013.01)

(58) Field of Classification Search
CPC ..... G06F 3/0485; G06F 3/0481; G06F 40/106
See application file for complete search history.

(56) References Cited

U.S. PATENT DOCUMENTS 6,803,930 B1    10/2004   Simonson
8,271,865 B1    9/2012    Bennett
(Continued)

FOREIGN PATENT DOCUMENTS

| CN | 105824410 A | 8/2016 |
| CN | 107729092 A | 2/2018 |

(Continued)

OTHER PUBLICATIONS

Parham, "How My Smartphone Revived the Purity of Reading" https://www.wired.com/story/smartphone-apps-optimized-reading/, Jul. 2018.

(Continued)

*Primary Examiner* — Asher D Kells
(74) *Attorney, Agent, or Firm* — Jefferson IP Law, LLP

(57) ABSTRACT

A method for managing operations on data presented on a display is presented. The method includes detecting data presented on the display of the electronic device; determining reading parameters associated with the data; performing a plurality of operations based on the reading parameters, wherein the reading parameters comprises at least one of a complete screen reading time taken by a user to completely read the data presented on the display of the electronic device, a partial screen reading time taken by the user to read at least one portion of the data, a scroll distance per one scrolling action on the display, or a data reading time which (Continued)

is a time taken to completely read the data presented on the display.

17 Claims, 24 Drawing Sheets

(51) Int. Cl.
 G06F 3/0481 (2022.01)
 G06N 5/022 (2023.01)
 G06F 3/04883 (2022.01)

(56) References Cited

U.S. PATENT DOCUMENTS

| | | | |
|---|---|---|---|
| 2012/0137217 A1 | 5/2012 | Amsterdam et al. | |
| 2013/0152014 A1* | 6/2013 | Rabii | G09G 5/10 715/785 |
| 2014/0032206 A1 | 1/2014 | Grieves et al. | |
| 2019/0187870 A1* | 6/2019 | Bostick | G06V 40/174 |
| 2020/0153776 A1* | 5/2020 | Qiu | H04L 51/226 |
| 2020/0192538 A1* | 6/2020 | Karpe | G06F 16/9574 |
| 2021/0216579 A1* | 7/2021 | Stelmar Netto | G06N 5/022 |

FOREIGN PATENT DOCUMENTS

| | | |
|---|---|---|
| JP | 2001-282414 A | 10/2001 |
| JP | 2005-156626 A | 6/2005 |
| KR | 10-1145906 B1 | 5/2012 |
| WO | 2018/046957 A2 | 3/2018 |

OTHER PUBLICATIONS

Pew Research Center, "The rise of e-reading" https://www.pewresearch.org/internet/2012/04/04/the-rise-of-e-reading-5/, Apr. 2012.

Moran, "Reading Content on Mobile Devices" https://www.nngroup.com/articles/mobile-content/, Dec. 2016.

Holland, "How Estimated Reading Times Increase Content Engagement" https://marketingland.com/estimated-reading-times-increase-engagement-79830, Apr. 2014.

Lesaux et al., "The Effects of Timed and Untimed Testing Conditions on the Reading Comprehension Performance of Adults with Reading Disabilities" Feb. 2006.

Haniff, "The Impact Of Timed Versus Untimed Standardized Tests On Reading Scores Of Third Grade Students In Title I Schools" (2012).

Maniaci et al., "Caring about carelessness: Participant inattention and its effects on research" Feb. 2014.

International Search Report and written opinion dated Sep. 28, 2020, issued in International Application No. PCT/KR2020/007882.

Extended European Search Report dated May 18, 2022, issued in European Application No. 20826824.3.

* cited by examiner (a)

(b)

(c)

(d)

(a)          (b)

METHOD AND APPARATUS FOR MANAGING DISPLAY OF READABLE DATA PRESENTED IN A PORTION OF A DISPLAY

TECHNICAL FIELD

The disclosure generally relates to a method and system for improving reading experience of a user on an electronic device. In particular, the disclosure relates to a method and system for improving reading experience of a user by managing operations on an electronic device based on reading parameters of the user.

BACKGROUND ART

Electronic devices such as portable electronic devices have gained widespread use and provide a variety of services, such as voice call services, messaging services, content presentation services, data management services, etc., to users. Portable electronic devices, such as smartphones, tablets, electronic readers, laptop computers, intended for handheld use present a variety of content to the users through a display screen of each of the devices. The widespread use of touch sensitive displays in portable electronic devices enable the users to interact with the content presented through the touch sensitive displays using different types of touch gestures. Each time the user needs to perform an action on the content displayed through the touch sensitive display of the portable electronic device, the user needs to reach to the touch sensitive display and perform the desired touch gesture on the touch sensitive display.

DISCLOSURE OF INVENTION

Solution to Problem

The proposed method addresses the existing problems for controlling the operations on the electronic device to provide improved reading experience to the users.

According to an aspect of the disclosure, a method for managing a variety of operations on data presented through an electronic device is provided. The method includes detecting data presented on the display of the electronic device; determining reading parameters associated with the data; performing a plurality of operations based on the reading parameters, wherein the reading parameters comprises at least one of a complete screen reading time taken by a user to completely read the data presented on the display of the electronic device, a partial screen reading time taken by the user to read at least one portion of the data, a scroll distance per one scrolling action on the display, or a data reading time which is a time taken to completely read the data presented on the display.

Advantageous Effects of Invention

Based on the proposed disclosure, managing of various operations including page control or scrolling control may be enabled with respect to data items presented on a screen of an electronic device.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Figure 1A:
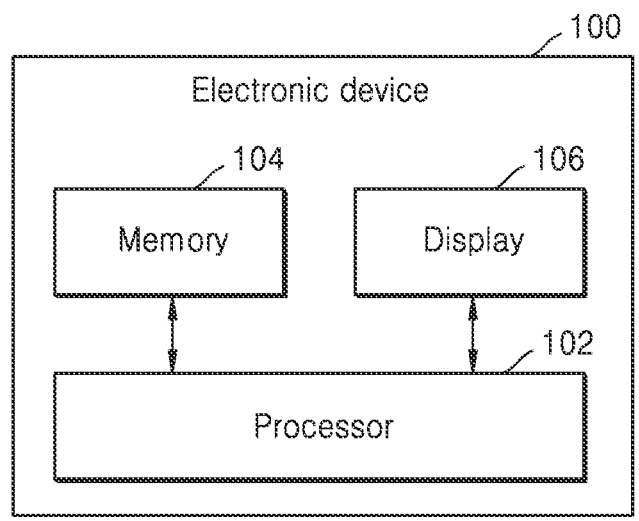
FIG. 1A is a block diagram of an electronic device 100 for managing various operations on data presented on a screen according to an embodiment of the disclosure.

According to an aspect of the disclosure, a method for managing a variety of operations on data presented through an electronic device is provided. The method includes detecting data presented on the display of the electronic device; determining reading parameters associated with the data; performing a plurality of operations based on the reading parameters, wherein the reading parameters comprises at least one of a complete screen reading time taken by a user to completely read the data presented on the display of the electronic device, a partial screen reading time taken by the user to read at least one portion of the data, a scroll distance per one scrolling action on the display, or a data reading time which is a time taken to completely read the data presented on the display.

According to another aspect of the disclosure, an apparatus for managing a plurality of operations on data presented on a screen is provided. The apparatus includes a display which displays the data; a processor configured to detect the data presented on the display, determine reading parameters associated with the data, and perform a plurality of operations based on the reading parameters where the reading parameters comprises at least one of a complete screen reading time taken by a user to completely read the data presented on the display of the electronic device, a partial screen reading time taken by the user to read at least one portion of the data, a scroll distance per one scrolling action on the display, or a data reading time which is a time taken to completely read the data presented on the display.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments and the embodiments herein include all such modifications.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention. Further, embodiments of the present disclosure use an electronic device such as, but not limited to, smartphone, tablet computer, personal computer, desktop computer, electronic reader or the like to perform the one or more operations in the present disclosure. In one or more embodiments, the electronic device includes a touch sensitive screen to enable the users to interact with the data items presented through the screen using one or more touch gestures.

One or more embodiments of the present disclosure use the electronic device for performing the one or more operations on one or more data items in a data file stored or accessed using the electronic device. The data file includes documents, text files, video files with subtitles, web pages, and other files that can be accessed using the electronic device and present one or more readable content to the users through a screen of the electronic device. In some embodiments, the content in the data file presented through the screen of the electronic device is termed as data items. The data items include text portion in the data file, image portion in the data file, subtitle portion in the data file, or a combination of any of these. In certain embodiments, the data file contains multiple data items, such as multiple lines of text or a sentence in a document, and the multiple data items are presented through the screen of the electronic device. In some other embodiments, the multiple data items presented through the screen of the electronic device may constitute a page or a fixed section in the data item. In some embodiment, the data file contains various data items, such as text, image, video, web content, etc., that are presented to the users through the screen of the electronic device in form of a continuous sequence or multiple section such as pages in the data file. The users can move from one data item to another or from one section containing multiple data items to another section by providing one or more inputs to the electronic device. In some embodiment, the users can interact with the data items presented through the screen of the electronic device using a touch on the screen or using a hand gesture.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein provide one or more methods and an electronic device for performing one or more operations based on the methods to provide an improved reading experience to a user on the electronic device. The embodiments herein disclose the one or more methods and the electronic device configured to manage one or more operations on one or more data items presented through a screen of the electronic device based on the reading parameters of the user. The methods disclosed herein utilize the electronic device to perform a variety of operations including detecting the one or more data items, i.e. a content of the one or more data items presented through the screen of the electronic device, a context corresponding to the one or more data items and creating one or more machine learning (ML) regression models to operate on the detected data items and the context of the data items. The methods disclosed herein further utilize the electronic device to predict one or more reading parameters of the user using the one or more ML regression models by operating on the detected data items and the context of the data items presented through the screen of the electronic device. Further, the methods disclosed herein utilize the electronic device to perform the one or more operations on the data items based on the predicted reading parameters of the user to improve the overall reading experience of the user on the electronic device.

Users are increasingly relying upon portable electronic devices having touch sensitive displays to read the variety of content such as documents, news, articles, web content etc. The touch sensitive displays displaying the content enable the users to perform actions, such as scrolling of the content or moving to another content on the touch sensitive display, by performing a touch or scroll gesture on the touch sensitive display. In addition, if the user opens a particular document to display on the touch sensitive display of the portable electronic device and wish to increase a font size of texts in the document for improving the readability of the document, then the user needs to perform a zoom touch gesture on the touch sensitive display. The need for the frequent actions on the touch sensitive display presenting the content affects the overall reading experience of the user using the portable electronic device. Alternately, when the display screen is on, accidental scroll touch while reading the documents will also hampers the overall reading experience of the user, Further, electronic devices including the portable electronic devices are generally configured to automatically turn off the display screens including the touch sensitive displays in case of inactivity for a preset period of time. The automatic screen timeout of turning off screen prevent excessive battery usage in the electronic devices. If the user is reading the content on the touch sensitive display of the portable electronic device and in the absence of any touch gestures on the touch sensitive display for the preset period of time, the touch sensitive display automatically turns off to prevent excessive battery usage of the portable electronic device. In order to continue reading the content, the user needs to turn on the touch sensitive display by using touch gestures or by pressing a button on the portable electronic device. Thus every time when the user is unresponsive for the preset period of time, while reading the content on the display screen of the electronic device, the display screen is automatically turned off and the user needs to manually turn on the display screen, which in turn affects the overall reading experience and productivity of the user.

In addition, the electronic devices are generally configured to provide notifications, including a call notification, message notification, advertisement, alert notification, etc., to the users through the display screens. The notifications are provided in form of pop up notifications on top of the content presented to the user through the display screen. In case of electronic devices with touch sensitive displays, the users can use touch gestures to either select a feature related to the notification or dismiss the notification from the touch sensitive displays. If the user is unresponsive upon receiving the notification, the notification stays on the display screen for a short period and automatically dismissed. If the user is reading a content on the display screen of the electronic device and if one or more received notifications are displayed over the content, then the overall reading experience of the user is affected. In order to continue reading on the touch sensitive display, the user needs to manually dismiss the notification using the touch gestures on the touch sensitive display.

The reliance on physical interactions such as the touch gestures on the touch sensitive display of the portable electronic device is minimized using gaze-based display control methods. In the gaze-based display control methods, the gaze direction or viewing location of the user is determined using a front facing camera of the portable electronic device. If the user is reading a content, then the scrolling of content is performed by determining the gaze location of the user using the front facing camera of the portable electronic device. In addition, the screen timeout or turning off of the display screen while reading the content is also automatically controlled by determining the change in the gaze directions of the user. However, in order to perform above said actions by determining the gaze direction and location of the user requires the continuous tracking of the gaze of the user using the front facing camera, which in turn reduces the battery life of the portable electronic device. Accordingly, an improved method for automated control of one or more operations on the electronic device while reading a content on the display screen is desirable.

The disclosure provides a method for managing one or more operations on a data item presented through a screen of an electronic device based on one or more predicted reading parameters of a user.

Another object of the embodiments herein is to provide a method for predicting the reading parameters of the user using one or more machine learning regression models.

Another object of the embodiments herein is to provide a method for predicting the reading parameters of the user using a content of the data item, context of the data item and the machine learning regression models.

Another object of the embodiments herein is to provide a method for training the machine learning regression models to predict a scroll distance of the screen displaying the data item.

Another object of the embodiments herein is to provide a method for training the machine learning regression models to predict a complete screen reading time taken by the user to completely read the screen displaying the data item.

Another object of the embodiments herein is to provide a method for training the machine learning regression models to predict a data item reading time of the user to read the data item.

Another object of the embodiments herein is to provide a method for determining a global data item reading time sequence for the one or more data items based on the data item reading time sequence of a number of user in a corpus.

Another object of the embodiments herein is to provide a method for highlighting one or more portions in the data item based on a popularity level for each of the portions determined from the global data item reading time sequence for the one or more data items.

Another object of the embodiments herein is to provide a method for dynamic screen timeout on the electronic device based on the predicted reading parameters of the user.

Another object of the embodiments herein is to provide a method for auto scrolling on the screen displaying the data items based on the predicted reading parameters of the user.

Another object of the embodiments herein is to provide a method for determining a fatigue of the user while reading the data item and displaying at least one recommendation associated with the fatigue to the user.

Another object of the embodiments herein is to provide a method for determining a time to place a notification or advertisement on the screen while the user reads the data item on the electronic device.

Another object of the embodiments herein is to provide a method for recommending a number of other users in the corpus to the user, while the user reads the data items, based on the reading parameters of the user and the plurality of other users for the data items.

Another object of the embodiments herein is to provide a method for determining a content refresh rate for the one or more data items based on the reading parameters of the user.

Another object of the embodiments herein is to provide a method for determining a random response in a survey based on the reading parameters of the user.

Another object of the embodiments herein is to provide a method for presenting subtitles based on the reading parameters of the user.

Another object of the embodiments herein is to provide a method for displaying a timer indicating an amount of time left to finish reading the one or more portions of the data items based on the reading parameters of the user.

Another object of the embodiments herein is to provide a method for indicating a reading stamp to the data item based on the reading parameters of the user.

Another object of the embodiments herein is to provide a method for automatically prioritizing message or files at the electronic device based on the reading parameters of the user.

Another object of the embodiments herein is to provide a method for determining a number of global reading parameters for a particular data item from a number of shared reading parameters of the user with the other users in the corpus.

The method starts by detecting the one or more data items displayed on a screen of the electronic device and determining a context of the one or more data items using the electronic device. The one or more data items and the context of the one or more data items are processed using one or more machine learning (ML) regression models to predict the reading parameters of the user for the one or more data items presented through the electronic device. The method further includes automatically performing the operations at the electronic device based on the predicted reading parameters of the user. Further, the method of automatically performing the operations on the electronic device based on the predicted reading parameters of the user is intended to improve an overall reading experience of the user on the electronic device.

In an embodiment, the predicted reading parameters of the user include a complete screen reading time taken by the user to completely read the one or more data items displayed on the whole screen of the electronic device, a partial screen reading time taken by the user to read at least one portion of the one or more data items displayed on the screen of the electronic device, a scroll distance of the screen displaying the at least one data item, and a data item reading time for the one or more data item. Each of data items visible on the screen has contribution to complete screen reading time.

In another embodiment, the context of the one or more data items presented through the screen of the electronic device is determined based on at least one of content of the one or more data items, a type of the content, a familiarity of the user with the content, a state of the electronic device, a scrolling pattern of the user, a reading proficiency of the user, time and a location of the electronic device configured to present the one or more data items to the user.

Accordingly, the embodiments herein further disclose methods for training the one or more machine learning regression models to predict the reading parameters of the user. The method using the electronic device enables training of the one or more machine learning regression models by uniformly dividing the screen displaying the one or more data items in the data file into a number of blocks, for each of the blocks, extracting features of the one or more data items contained in the blocks, creating a first training dataset that include an actual time taken by the user to completely read the screen displaying the one or more data items, the extracted features per block of the one or more data items and the context of the one or more data items and creating a second training dataset that include an actual scroll distance, the extracted features per block of the one or more data items and the context of the one or more data items. Further, the method include training a first ML regression model from the one or more ML regression models utilizing the first training dataset to predict a complete screen reading time taken by the user to completely read the screen displaying the one or more data item. Further, the method include training a second ML regression model from the one or more ML regression models utilizing the second training dataset to predict a scroll distance of the screen displaying the one or more data items.

Accordingly, the embodiments further disclose a method for determining a visual focus distribution on the screen displaying the one or more data items based on a pattern of weights of one or more block level layers of the trained ML regression models. Upon determining the visual focus distribution on the screen displaying the one or more data items, dividing the actual complete screen reading time among the plurality of blocks based on the visual focus distribution. Further, the method utilizes the electronic device for determining an actual data item reading time of each of the data items by assigning the actual complete screen reading time divided among the blocks to the data item of the block. The method utilizes the electronic device for determining the actual data item reading time of the one or more data items based on a number of times the data items displayed on the screen on consecutive scrolls. Further, the method utilizes the electronic device for determining a data item reading time sequence for the one or more data items in the data file based on the actual data item reading time of each of the data items.

Accordingly, the embodiments herein further disclose a method for creating a third training dataset that includes the one or more data items, the context of the data items and the actual data item reading time of each of the data items. Further, the method includes training a third ML regression model from the one or more ML regression models utilizing the third training dataset to predict a data item reading time.

Accordingly, the embodiments herein further disclose a method that include collecting the data item reading time sequences of a number of users for the one or more data items using a server or the electronic device and determining a global data item reading time sequence for the one or more data items from the collected data item reading time sequences of the number of users. In some instances, the global data item reading time sequence for the one or more data items is utilized for determining a popularity level for each portion of the one or more data items. The popularity level for each of the portions of the data items is further utilized to highlight the portions of the one or more data items displayed on the screen of the electronic device using at least one visual indicator. Further, the predicted reading parameters of the user are utilized to perform the one or more operations on the electronic device to provide overall improved experience to the users. In one instance, the operations performed based on the predicted reading parameters include a dynamic screen timeout and an auto scrolling of content corresponding to the at least one portion of the at least one data item presented through the screen of the electronic device.

Accordingly, the embodiments disclose a method including detecting one or more actual reading parameters of the user for the at least one data item, identifying a deviation in one or more predicted reading parameters of the user by comparing the actual reading parameters of the user and the predicted reading parameters of the user and automatically outputting a message indicative of the deviation to the user through the screen of the electronic device. The deviation in the predicted reading parameters of the user determined by the electronic device is used to determine a time to place a notification or advertisement on the electronic device, also determines a fatigue of the user and the electronic device displays one or more recommendations associated with the fatigue to the user.

Accordingly, the embodiments herein disclose an electronic device having a memory to store one or more data files, each having one or more data items, and a processor configured to perform a variety of operations on the one or more data items based on a number of predicted reading parameters of a user. The processor of the electronic device is configured to detect the one or more data items displayed on a screen of the electronic device and a context of the one or more data items in the data file. The processor is further configured to utilize the one or more data items and the context of the one or more data items on one or more machine learning (ML) regression models to predict the reading parameters of the user for the one or more data items. The processor of the electronic device is further configured to automatically perform the operations based on the predicted reading parameters of the user and thereby improving an overall reading experience of the user on the electronic device.

Referring now to the drawings, and more particularly to FIGS. 1 through 12, where similar reference numbers denote corresponding features consistently throughout the drawings, there are shown embodiments.

FIG. 1A is a block diagram of an electronic device 100 for managing various operations on data presented on a screen according to an embodiment of the disclosure.

The electronic device 100 includes a processor 102 configured to perform the various operations on data presented on a display 106 of the electronic device. Throughout the specification, the term of 'screen' may be used interchangable with the term of 'display.'

The electronic device 100 also includes a memory 104 to store a variety of information including the electronic file or the computer readable data file corresponding to the data presented on the display 106 and the display 106 configured to present the data in the format of computer readable data file to the user. In an embodiment, the processor 102 of the electronic device detects the data which may be presented as text format to the user through the display 106 of the electronic device 100. In an embodiment, the processor 102 detects a context of the data presented through the display 106 of the electronic device 100, an actual scrolling interval detector 112 to detect the scrolling interval between consecutive scrolls on the display 106 displaying the data and the processor 102 detects the scroll distance on the display 106 displaying the data.

Figure 1B:
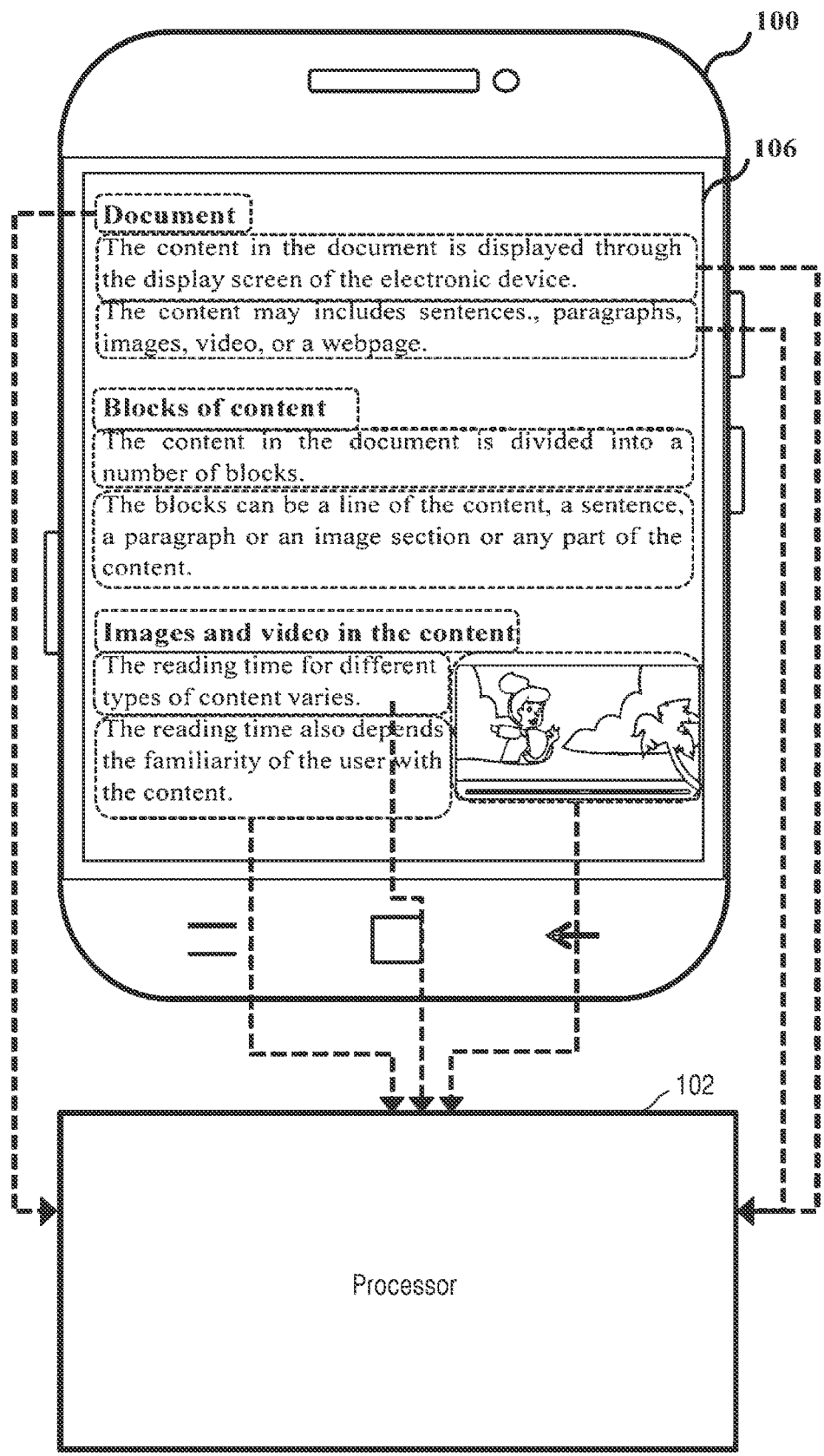
FIG. 1B is a block diagram illustrating an operation for data detection and a context detection, according to an embodiment of the disclosure.

FIG. 1B is a block diagram illustrating an operation for data detection and a context detection, according to an embodiment of the disclosure.

In an embodiment, the electronic device 100 presents data or a electronic document associated with at least one data file. The data displayed on the display 106 of the electronic device 100 includes one or more sentences in the document and/or images in the document. The images in the document may include, but not limited to a moving image such as video content. The processor 102 detects each of data items in the document which is displayed on the display 106 of the electronic device 100. In an embodiment, the processor 102 detects each of the data items in the document when the data items are displayed on the display 106 of the electronic device 100. In another embodiment, the processor 102 detects each of the data items in the document while the document is stored in the memory 102 of the electronic device 100. The processor 102 determines the context of the one or more data items based on content of the one or more data items, a type of the content, a familiarity by the user with the content, a state of the electronic device 100 such as screen orientation of the electronic device 100, a scrolling pattern of the user, a reading proficiency of the user, time of day, time elapsed since the user started reading, and/or a location of the electronic device 100. Throughout the specification, the data items mean text data, image data or combination thereof presented as computer readable document file on the display 106 of the electronic device 100.

Figure 1C:
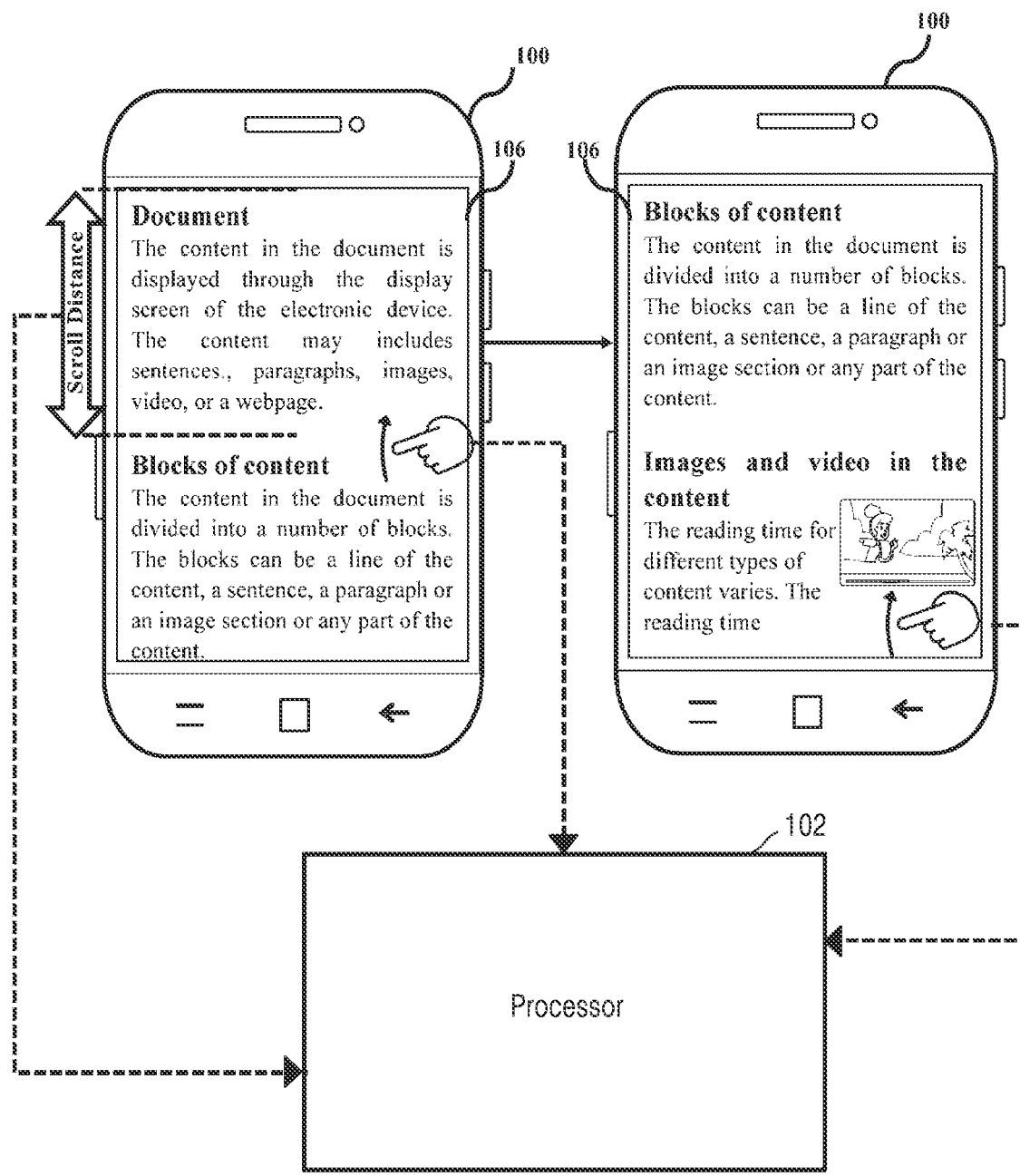
FIG. 1C is a block diagram illustrating an operation of detecting a scrolling interval between consecutive scrolls on the display 106 and a scroll distance on the display 106 associated with the electronic device 100, according to an embodiment of the disclosure.

FIG. 1C is a block diagram illustrating an operation of detecting a scrolling interval between consecutive scrolls on the display 106 and a scroll distance on the display 106 associated with the electronic device 100, according to an embodiment of the disclosure.

In an embodiment, the processor 102 is configured to detect the scrolling time interval between one or more consecutive scrolls on the one or more data items presented through the display 106 of the electronic device 100. To accurately estimate the scrolling time interval, information of a font size, a space size between words and paragraphs, a screen size, and/or a number of lines skipped per one scroll may be determined in advance. The processor 102 is configured to detect the scroll distance per one scrolling action on the one or more data items presented through the display 106 of the electronic device 100. The scrolling time intervals and the scroll distances obtained from one or more scrolling action of the user is utilized by the processor 102 to determine the actual reading parameters of the user on the one or more data items presented through the display 106 of the electronic device 100.

In one or more embodiments, the content of the one or more data items presented through the display 106 and detected and the context of the one or more data items determined by the processor 102 are further utilized by the electronic device 100 to predict and/or determine the reading parameters of the user for the one or more data items. In an embodiment, the electronic device 100 process the content of the one or more data items, the context of the one or more data items and one or more outputs from one or more machine learning (ML) regression models to predict or determine the reading parameters of the user for the one or more data items. In an embodiment, the reading parameters may include a complete screen reading time taken by the user to completely read the data items displayed on the display 106 of the electronic device 100, a partial screen reading time taken by the user to read at least one portion of the data items displayed on the display 106 of the electronic device 100, a scroll distance of the display 106 displaying the data items and a data item reading time. The data item reading time may be a time taken to read data items on the display 106. For example, the data item reading time for block 1 of the screen may be different from the data item reading time for block 2 of the screen even though the block 1, 2 are the same size due to the complexity or the depth of interest with respect to each of blocks of the screen. The data item may be at least one sentence. Upon determining the reading parameters, the electronic device 100 automatically performs the one or more operations associated with the reading parameters at the electronic device 100 and on the data item presented through the display 106 of the electronic device 100 to provide an improved overall reading experience to the user.

In an embodiment, a font size used in the data item, an overall size of the display, a space size between words, and/or a space size between lines, a space size between paragraphs are taken into consideration to determine the complete screen reading time and/or the partial screen reading time. In particular, if the font size used in the data item is big, the complete screen reading time may be reduced compared to the data with a smaller font size. Likewise, the larger the space size between the paragraphs is, the bigger is either the complete screen reading time or the partial screen reading time.

Figure 1D:
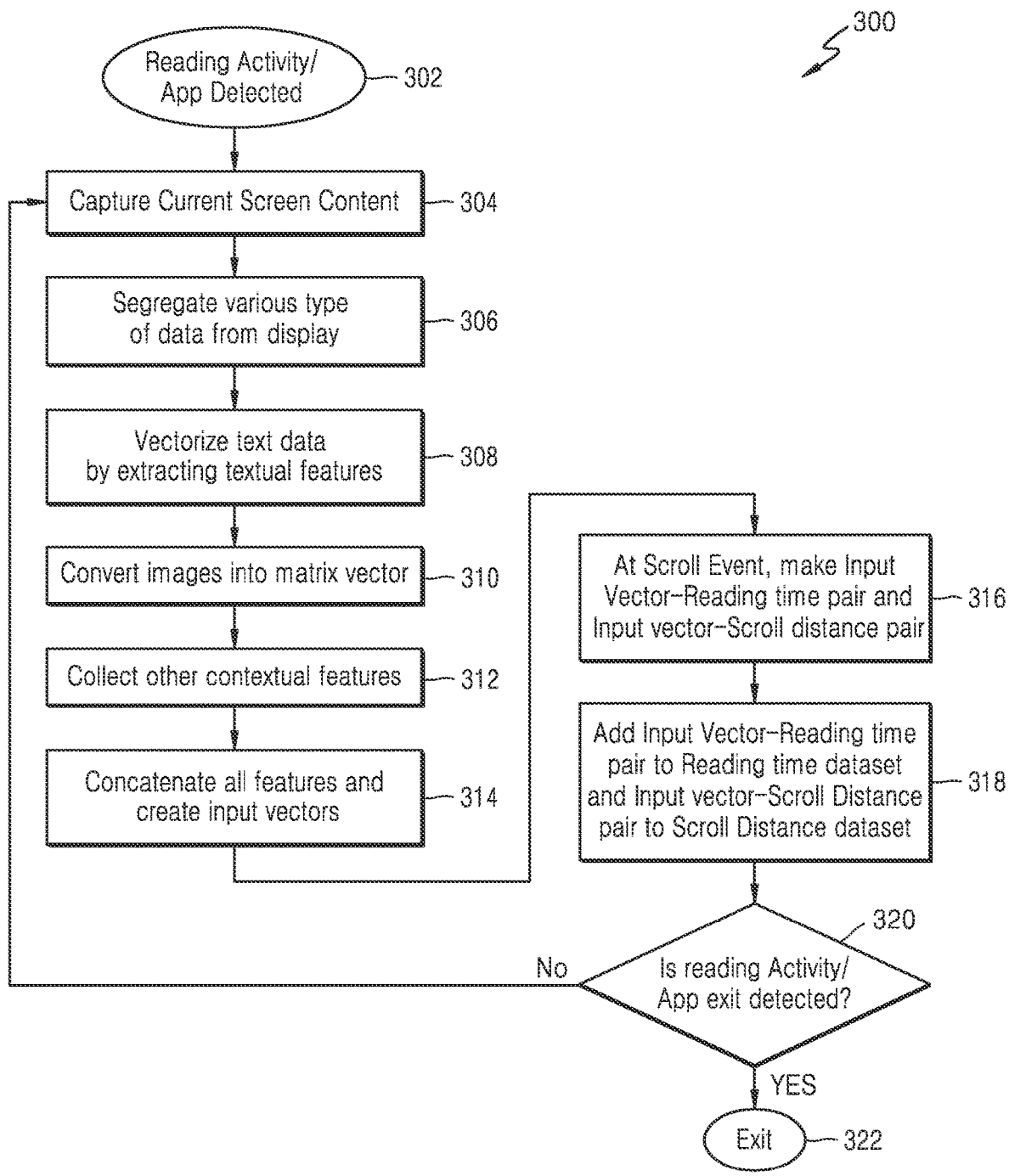
FIG. 1D is a flowchart 300 illustrating method of generating one or more training datasets for training the one or more ML regression models, using the processor 102 associated with the electronic device 100 to determine the reading parameters of the user for the one or more data items presented through the display 106 of the electronic device 100, according to an embodiment of the disclosure.

FIG. 1D is a flowchart 300 illustrating method of generating one or more training datasets for training the one or more ML regression models, using the processor 102 associated with the electronic device 100 to determine the reading parameters of the user for the one or more data items presented through the display 106 of the electronic device 100, according to an embodiment of the disclosure.

In operation 302, the method of generating a first training dataset and a second training dataset includes detecting, by the processor 102, whether a reading application being utilized for presenting the data items as computer readable documentary file on the electronic device 100. In operation 304, the processor 102 captures the current screen content or the data items on the display 106. In operation 306, the processor 102 segregates the captured data items from the display 106 based on the data format such as text, image or other types of format. In operation 308, the processor 102 vectorizes the segregated data items in text format by extracting corresponding textual features. In machine learning, a feature vector is an n-dimensional vector of numerical features that represent some object. Machine learning models understand data in the form of numbers, hence the textual features extracted from the text data are converted into vector(s) (a mathematical way of representing multiple numbers) to represent each of textual features uniquely. Vectors are the matrix having either number of row or column equals to 1. Textual features such as a number of words included in each block or on the screen, bag-of-words, topic modelling features to capture user interests and/or article type, language proficiency (word familiarity) representing whether a word may be known to the reader or not by storing most frequently used words, POS tagging, TF, IDF may be extracted from data items on the screen. The bag-of-words defines a dictionary of unique words contained in the data items, and then finds the count of each word within the data items. For example, if one user is to collect a list of unique words from ' Harry Potter' series 1, and then split the full list into words by chapter, the user would end up with an array that has one chapter per row and the counts of each word going across the columns. Hence, "vectorizing the data items" mean extracting and/or calculating textual features from content (data items) on the screen and representing them as row/column vector.

In operation 310, the processor 102 converts the segregated data items in image format captured from the display 106 into matrix vector. An RGB image is stored as an m-by-n-by-3 data array that defines red, green, and blue color components for each individual pixel. A simple feature representation of an image is the raw intensity values of each pixel. The intensity values form an m-by-n-by-3 matrix that is inputted to the neural network ML regression model. In an embodiment, the m-by-n-by-3 values are unrolled into a row/column vector to be used as a feature vector of the image in ML regression models. The feature matrix is passed to a convolutional neural network (ML regression model) that further extracts graphical features such as shapes, object types, color, texture, actions etc. and using them for generating an intended prediction/output as per its training.

In operation 312, the processor 102 extracts contextual features associated with the captured data items in text format and the data items in image format. Factors other than the content present on the screen can impact time spent on the screen before scrolling ahead. These factors are captured as contextual features such as elapsed time taken from a point when the reading activity has started, the orientation of the screen, multitasking status of applications (whether background music is playing, the number of multi windows/floating windows), current time, current location of the electronic device, font size of the data items, font style of the data items, a user engagement level, etc.

In operation 314, the processor 102 concatenates the extracted contextual features and generates input vectors. In other words, the feature vectors such as the textual feature vector, contextual feature vector and the (image) matrix vector are all grouped to form a single input feature instance and to be inputted to the ML regression model for the learning and training. In an embodiment, all the feature vectors may be concatenated/joined together to form one input feature vector. If vector is 1 column-by-P rows, other vector is 1 column-by-Q rows. Then after concatenating result vector will be 1 column-by-P+Q rows.

In operation 316, the processor 102 makes at least one reading time-input vector pair for the first training dataset and at least one scroll distance-input vector pair for the second training dataset upon detecting a scroll event on the display 106. The training dataset may include pairs of an input vector (feature vector) and the corresponding output vector (label/target). During training of the ML regression model, the current model is run with the training datasets and produces a result, which is then compared with the target, for each input vector in the training dataset. For each scroll action by the user, the input feature vector of the screen (a combined form of all the textual feature vector, the (image) matrix vector and the contextual feature vector of the screen) and the reading time of screen (time elapsed from the last scroll till the current scroll action) are paired to form an input {feature vector—screen reading time} pair for the displayed screen. This pair is one training instance of a training dataset. Similarly, the input feature vector and scroll amount/distance of the current scroll action are paired to form {input feature vector-scroll distance} pair for the displayed screen.

In operation 318, the processor 102 adds the reading time-input vector pair to a reading time dataset or the first training dataset and the scroll distance-input vector pair to a scroll distance dataset or the second training dataset. In operation 320, the processor 102 detects whether the reading application is inactive in the electronic device 100 and exits a training dataset generation process in operation 322. The first and the second training dataset thus generated is utilized as an input to the processor 102 for further processing. The generated {input feature vector-screen reading time} pair and {input feature vector-scroll distance} pair are collected for each displayed screen at every scroll action. The dataset formed by collecting {input feature vector-reading time} pairs is referred to as first training dataset and the dataset formed by collecting {input feature vector-scroll distance} pairs is referred to as second training dataset.

Figure 1E:
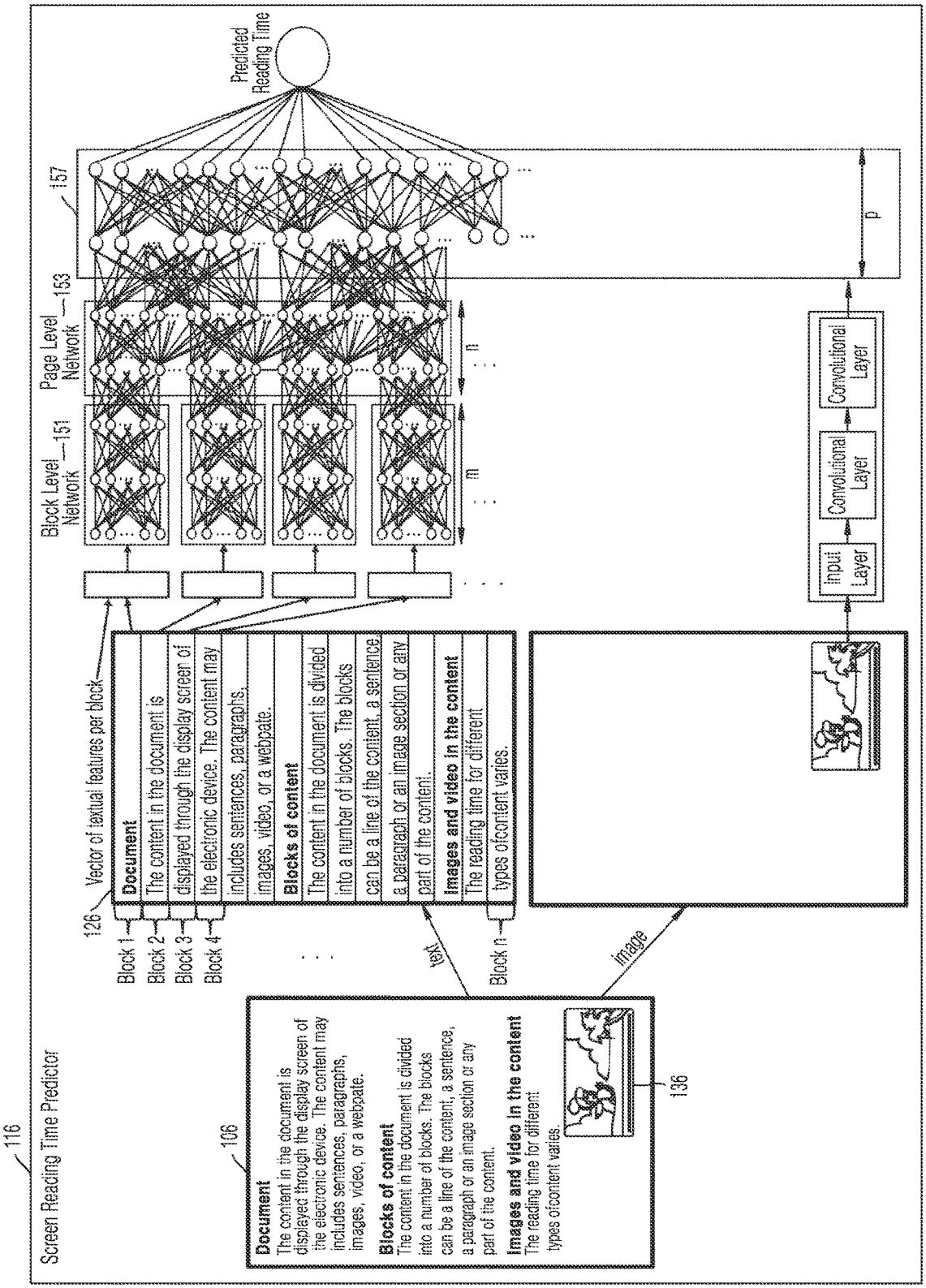
FIG. 1E is a block diagram of determining the screen reading time, according to an embodiment of the disclosure.

FIG. 1E is a block diagram of determining the screen reading time, according to an embodiment of the disclosure.

Referring to FIG. 1E, an architecture of the neural network ML regression model is depicted and used to predict the screen reading time. In an embodiment, the processor 102 of the electronic device 100 equally divides the screen of the display 106 displaying the data items into a number of blocks—Block 1, Block 2, Block 3, . . . , Block N where N is an integer. Further, the processor 102 extracts a variety of features including the contextual features of the data items in each of the blocks in the screen of the display 106. The processor 102 generates a first training dataset including the actual complete screen reading time i.e. the time actually taken by the user to completely read the data items presented on the display 106, extracted features per each block of the screen and the context of the data items. The processor 102 or a remote server (not shown) trains a first ML regression model using the first training dataset to predict or determine the complete screen reading time taken by the user to completely read data items presented on the display 106. The predicted or determined complete screen reading time would be equivalent to the actual complete screen reading time as much as possible. A training data including a set of training examples is generated. Each training example is a pair consisting of an input vector extracted from screen content or data items and a desired output value of the actual complete screen reading time. This training data is fed to the first ML regression model like deep neural network for training using trained weights of the first ML regression models (initial Block level network in FIG. 1E as shown). Once the ML regression model is trained, the trained ML regression model can, for any given content on the screen, output a screen reading time (time spent on screen before scrolling ahead) based on input i.e. the input feature vector (numerical representation of screen content). The ML regression model may consist of artificial neurons (mathematical functions) and weights associated with interconnection of neurons. Activation function of artificial neurons can be linear, sigmoid, rectifier etc. The architecture in FIG. 1E shows how the input is given to proposed neural network and how various layers/neurons are interconnected. At the beginning of the training, weights of the ML regression model associated with interconnections among neurons are randomly initialized. While training the ML regression model, the current model with current weight is run with input features of training dataset and produces a result. The result is then compared with the labels in dataset to determine how the weights should be adjusted so that the result becomes closer to label/target. The iterative process of adjusting weights incrementally can be done using algorithms such as Stochastic Gradient Decent, RMSProp etc. The architecture in FIG. 1E is the same for both the screen reading time prediction model and the scroll distance prediction model. For the scroll distance prediction model, a neural network with same architecture of FIG. 1E is trained on the second training dataset consisting of {input feature vector-scroll distance} pairs. The trained ML regression model can, for any given screen content, output the scroll distance amount by which user will scroll to get to next content based on input i.e. input feature vector which is a numerical representation of current screen content.

In an embodiment, the processor 102 generates a block level network and a page or screen level network for the data items presented on the display 106 of the electronic device 100. The vectors of the extracted textual features, which is as discussed referring to FIG. 1D, are determined for each block. Further, the processor 102 maps the input vectors, i.e. the vectors of the extracted textual features to the corresponding blocks and the pages of the data item presented on the display 106 of the electronic device 100. In an embodiment, for each block of Block 1, Block 2, Block 3, . . . , Block n, in a page of the data item displayed on the display 106, the extracted textual features are given to corresponding block level network. Referring to FIG. 1E, the whole page presented on the display 106 is divided into each of the blocks—Block 1, Block 2, Block 3, . . . , Block n. The page may be divided uniformly. For example, each rectangle in the screen 126 corresponds to each of the blocks with a fixed width.

Further, the processor 102 generates an image network by mapping the matrix vectors to the corresponding images 136 in the data items. Further, block level layer weights are initialized according to normal distribution. Referring to FIG. 1E, 'm' represents the number of layers in the block level network 151, 'n' represents the number of layers in the page or screen level network 153 and 'p' represents number of layers in a combined network 157. Further, the processor 102 fully connects the block level network to the page or screen level network, which is further combined with the image network to incorporate every contribution of content or the data items presented on the display 106 of the electronic device 100.

Figure 1F:
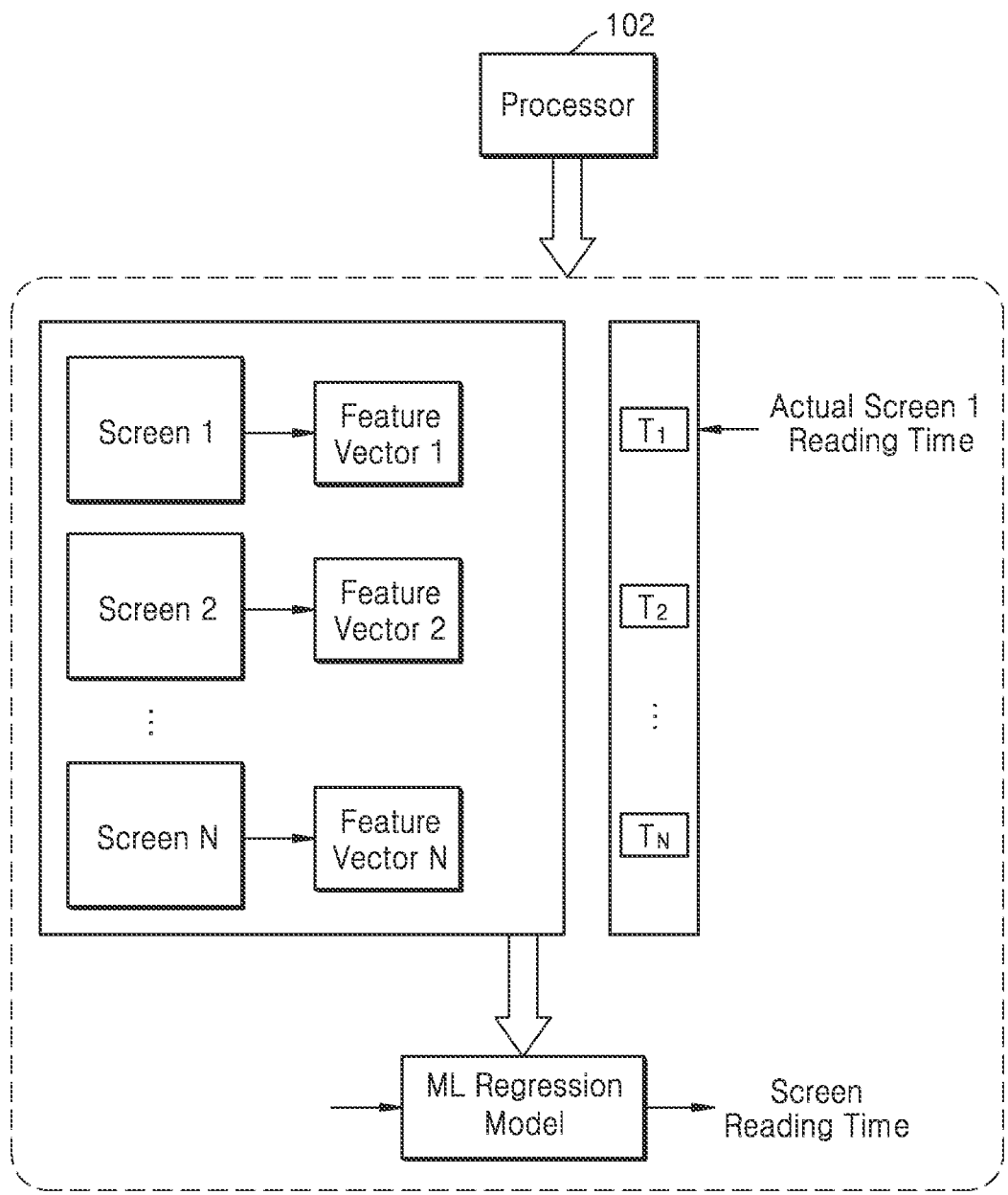
FIG. 1F is a block diagram illustrating training of the screen reading time prediction for the data file utilizing the first training dataset by the processor 102 associated with the electronic device 100, according to an embodiment of the disclosure.

FIG. 1F is a block diagram illustrating training of the screen reading time prediction for the data file utilizing the first training dataset by the processor 102 associated with the electronic device 100, according to an embodiment of the disclosure.

The data file includes the one or more pages each of which has one or more data items presented through one or more screens, Screen 1, Screen 2, Screen 3, . . . , Screen N (N is an integer) of the electronic device 100. In the first training dataset, the extracted feature vectors of each of the data items presented in Screen 1 to N of the electronic device 100, the context of the one or more data items presented in Screen 1 to N, are mapped to the corresponding actual scroll intervals $T_1, T_2, T_3, \ldots T_N$ detected using the processor 102. The feature vectors may include, as illustrated before, the textual feature vector, the contextual feature vector and image matrix vector. In an embodiment, the screen reading time prediction model takes the feature vectors derived from content of the screen and context as the input during training phase of model as well as during prediction phase. The screen reading time prediction model will be trained on the first training dataset containing mapped pairs of feature vectors of the data items on the screen and actual screen reading time. The screen reading time prediction model may take the feature vector as input and predict the screen reading time as output. The screen reading time prediction model is trained to learn weights of model to match the predicted screen reading time with the actual reading time in the training dataset.

As can be seen in FIG. 1F, the feature vector 1, 2, 3, . . . , N among the extracted feature vectors of the data items correspond to Screen 1, Screen 2, Screen 3, . . . , Screen N, respectively. The mapping thus obtained for the screens displaying the data items, context and the actual scrolling interval between the screens which include Screen 1 to Screen N is processed using the ML regression model to predict the complete screen reading time taken by the user to completely read the screens which include Screen 1 to Screen N and display the data items.

Figure 1G:
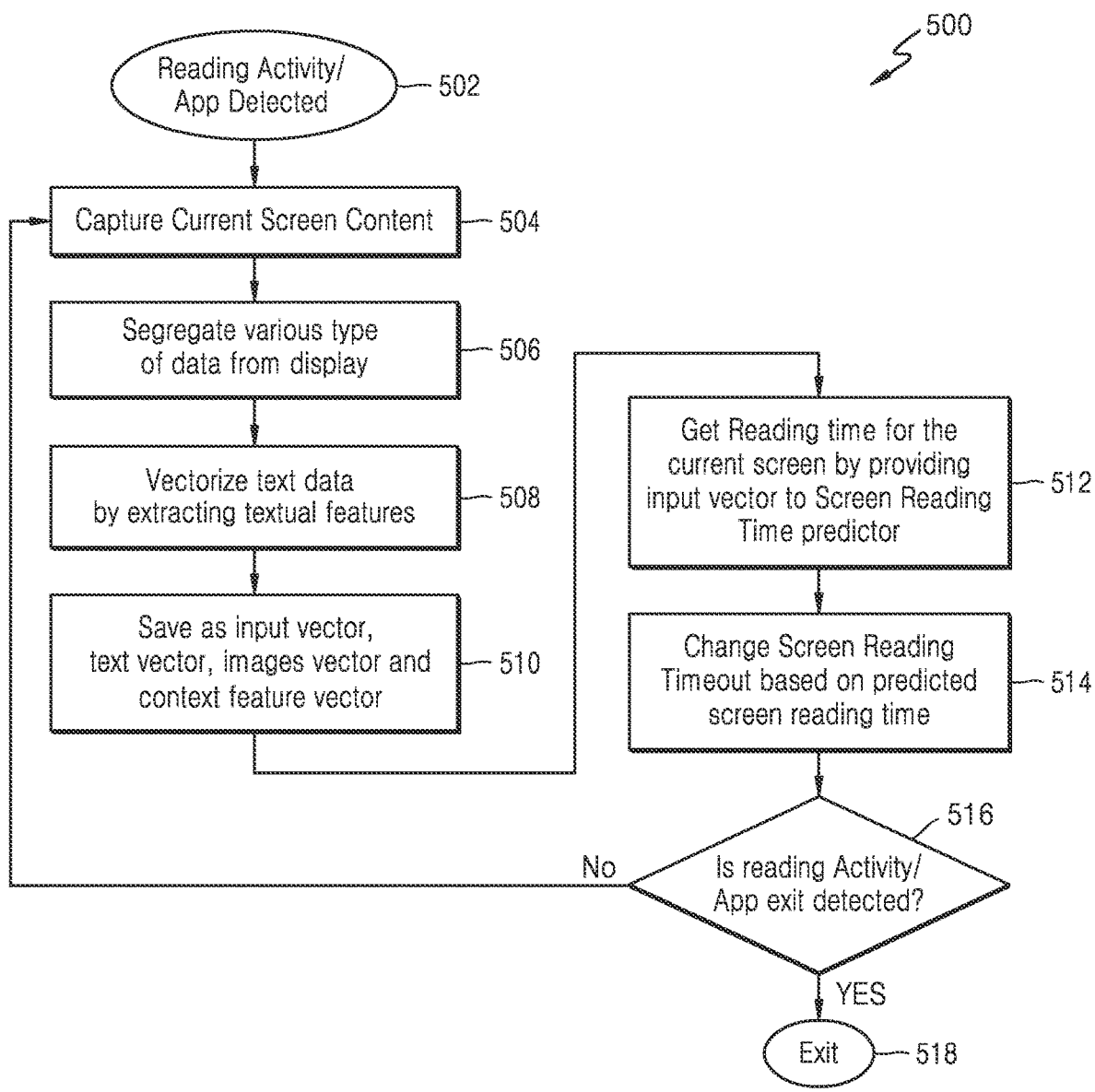
FIG. 1G is a flowchart 500 illustrating a method of predicting the complete screen reading time using the one or more trained ML regression models and an input vector generated in real-time using one or more extracted contextual features of the data items presented through the display 106 of the electronic device 100, according to an embodiment of the disclosure.

FIG. 1G is a flowchart 500 illustrating a method of predicting the complete screen reading time using the one or more trained ML regression models and an input vector generated in real-time using one or more extracted contextual features of the data items presented through the display 106 of the electronic device 100, according to an embodiment of the disclosure.

The method of predicting the complete screen reading time includes detecting, using the processor 102, whether the reading application has opened the data file having one or more data items in operation 502. The data file may be a documentary file containing one or more data items such as textual data and/or image data. In operation 504, the processor 102 captures the current screen content or the data items presented through the display 106. The processor 102 segregates the various types of data formats in the data items in operation 506. The type of data formats may be at least one of text or image. In operation 508, the processor 102 vectorizes the segregated text data by extracting the textual features and saves the text vector, images vector and any other context feature vector as the input vector for estimating the screen reading time predictor 116, in operation 510. The screen reading time predictor 116 may be implemented as the processor 102. In operation 512, the processor 102 predicts or determines the complete screen reading time using the input vector as one of the inputs in the trained first ML regression model. The predicted or determined complete screen reading time thus obtained for the particular content or the data items presented through the display 106 is utilized for dynamically adjusting the screen timeout for the whole screen using the processor 102 when the user reads the content presented via the whole screen in operation 514. When the processor 102 detects that the reading application is inactive in operation 516, the processor 102 controls to stop the operation in operation 518.

In one embodiment, the processor 102 of the electronic device 100 utilizes the second training dataset, which is generated referring to FIG. 1D. The second training dataset may include the actual scroll distance, extracted features per block and the context of the data items which are used to train a second ML regression model from the one or more ML regression models to predict the scroll distance on the display 106 displaying the one or more data items. The actual scroll distance is the difference of vertical positions of the same part in two consecutive screens displaying data items in response to one scrolling action.

In an embodiment, the processor 102 trains the second ML regression model utilizing the second training dataset to predict the scroll distance between the current scroll to the next scroll for a given screen displaying the data items. Further, the processor 102 predicts or determines the scroll distance using the same input vector in the trained second ML regression model. The predicted or determined scroll distance obtained is utilized by the processor 102 to automatically scroll the display 106 displaying the data items. The predicted or determined scroll distance would be equivalent to the actual scroll distance as much as possible based on the trained second ML regression model. In an embodiment, a training data including a set of training examples is generated. Each training example is a pair including an input vector extracted from screen content and a desired output value of a scroll distance. This training data may be fed to the trained second ML regression model for training and the next scroll distance is determined based on a user behavior and the trained second ML regression model.

Figure 1H:
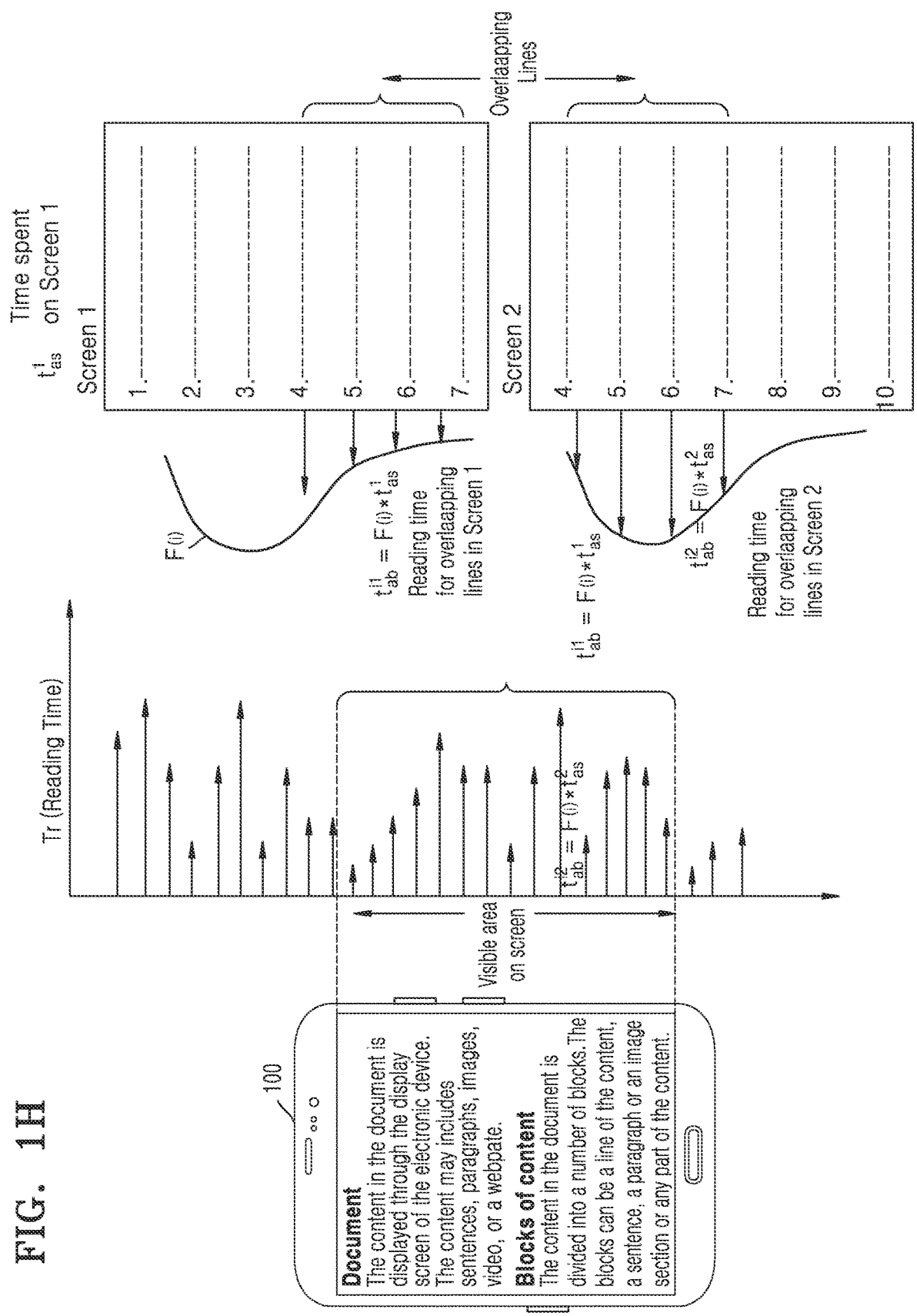
FIG. 1H illustrates utilizing the data item to determine the actual data item reading time or time for reading each data item presented through the display 106, according to an embodiment of the disclosure.

FIG. 1H illustrates utilizing the data item to determine the actual data item reading time or time for reading each data item presented through the display 106, according to an embodiment of the disclosure.

Instead of reading the data items from top to bottom, the users generally read a part of the data items presented through the display 106 and scrolls the screen to bring the desired content or data item in the consecutive screens or pages of the data file as per the reading pattern or visual focus distribution of the user. The visual focus distribution may be a distribution representing a degree of user's focus or a level of attention on each of blocks of the screen. The visual focus distribution may not be associated with data items or content included in each of blocks but be associated with physical areas of the screen. Instead of reading the screen from top to bottom, users generally read a part of screen and keep scrolling to bring the content to that part in accordance with their reading pattern and visual focus distribution. Also the visual focus pattern or the visual focus distribution of a user is mostly constant over a period of time. There may only be small gradual change over long period of time. The visual focus distribution may be estimated based on the scroll actions and the complete screen reading time, and/or the actual complete screen reading time.

The screen reading time prediction model is to learn to predict total time spent by a user on entire screen using the features extracted from data items on the screen. All regions and blocks of the screen do not have equal contribution to total screen reading time due to visual focus pattern or visual focus contribution. So in the process of learning to predict the complete screen reading time, the complete screen reading time model also learns which regions or blocks of the screen have high or low contribution to total screen reading time. To enable extraction of this learning of visual focus contribution, method of dividing the screen into uniform regions or blocks and extracting features from data items on the block level instead of overall page level is introduced.

Feature extracted from a particular region or a block of the screen is inputted only to a corresponding block level network. The block level networks are not interconnected to each other. Hence, the flow of information from input to the page level network is channeled and the block level layers act as gates of information flow. During the training process, the weights of the block level network must be adjusted such that blocks at which user has higher focus and having higher contribution to the screen reading time have larger magnitude allowing for more information flow. And blocks which have lesser focus and lesser contribution have smaller magnitude restricting the flow of information as it is not much relevant to the screen reading time. Thus, the pattern of weights across the block level network follows the pattern of visual focus. For example if screen is divided into P block then we determine P values for each block. For each block level network, an average of magnitude of weights of that network is taken. This may be P values. A maximum value of these P values may be found and all the P values are divided with the maximum value. Resultant P values are the visual focus distribution (values) F(i) for $i^{th}$ block. These P values lie from 0 to 1 and the sum of all values is 1.

$$0 \le F(i) \le 1 \text{ for } 1 \le i \le P, \sum_{i=1}^{P} F(i) = 1 \qquad \text{Equation (1)}$$

For any block i, its corresponding visual focus distribution value (i) represent the fraction of contribution of block i to the complete screen reading time. In an embodiment, initial values of (i) can be taken with a known visual focus distribution of general user population. And the initial values of the visual focus distribution can be modified as per user's personal reading pattern using trained weights of the block level layers in screen reading time model as explained above.

In some cases, the user may happen to spend more time on certain data item and the variation of reading time for each of data item (for each block) is captured. The visual focus distribution of the user on the display 106 indicates the level of focus or the level of attention of the user on each block of data item on the display 106. Initially a standard visual focus distribution or most common visual focus distribution F(i) on the blocks is taken as a default visual focus distribution, where 'i' denotes the block position on the display 106 displaying the data item. To determine the visual focus distribution of each user, the F(i) is modified by the processor 102 based on the pattern of weights of the block level layers of the trained ML regression models. In one instance, the actual complete screen reading time for data items presented on the display 106 displaying is utilized to determine the reading time of each block of the screen. The reading time of each block may be a block reading time spent for reading each block. The actual complete screen reading time is distributed to each block of the screen based on the visual focus distribution values F(i) to determine the reading time for each block of the screen. The actual reading time of $i^{th}$ block of the screen is determined using the Equation (2).

$$t_{ab}^{i} = F(i) * t_{as}^{n} \qquad \text{Equation (2)}$$

where $t_{ab}^{i}$ is an actual reading time of $i^{th}$ block and $t_{as}^{n}$ is the total time spent on Screen 1 to N where n=1 to N.
Here, $$\sum_{i=1}^{P} t_{ab}^{i} = t_{as}^{n}. \qquad \text{Equation (3)}$$

In some instances, the consecutive screens after each of scrolling by the user include an overlapped or repeated blocks of data items. In such an instance, the reading time of overlapping blocks are determined by combining or adding the individual reading time for the overlapped blocks, $t_{ab}^{i1} + t_{ab}^{i2}$.

Once the visual focus distribution based on the pattern of weights of the block level layers of the trained ML regression models is determined using the visual focus distribution detection performed by the processor 102, the processor 102 divides the actual complete screen reading time among the blocks in the display 106 based on the determined visual focus distribution. Further, the processor 102 determines an actual (data item) reading time for a particular block on the display 106 by assigning the divided actual complete screen reading time to each block in the display 106. For overlapping blocks in consecutive screens, the actual reading time for the data items in the overlapping blocks is determined based on the number of times the data items displayed on the display 106 on consecutive scrolls. The overlapping blocks in consecutive screens mean that for a data item staying on the screen on consecutive scrolls, all of its reading times calculated multiple times (overlapped) are combined or added together. For any given document read by the user, a sequence of data items and their actual data item reading time is generated and called a reading time sequence for the data items or a data item reading time sequence. Further, the processor 102 determines an actual reading time sequence for the data items in the data file based on the actual reading time for each block.

Once the actual reading time sequence for the data items in the data file is determined, the processor 102 generates a third training dataset including the data items, the context of the data items, and the actual reading time. The processor 102 further trains a third ML regression model from the one or more ML regression models using the third training dataset to predict a data item reading time in the display 106. In one instance, the data item can be a sentence and the predicted data item reading time can be a sentence reading time.

Figure 1I:
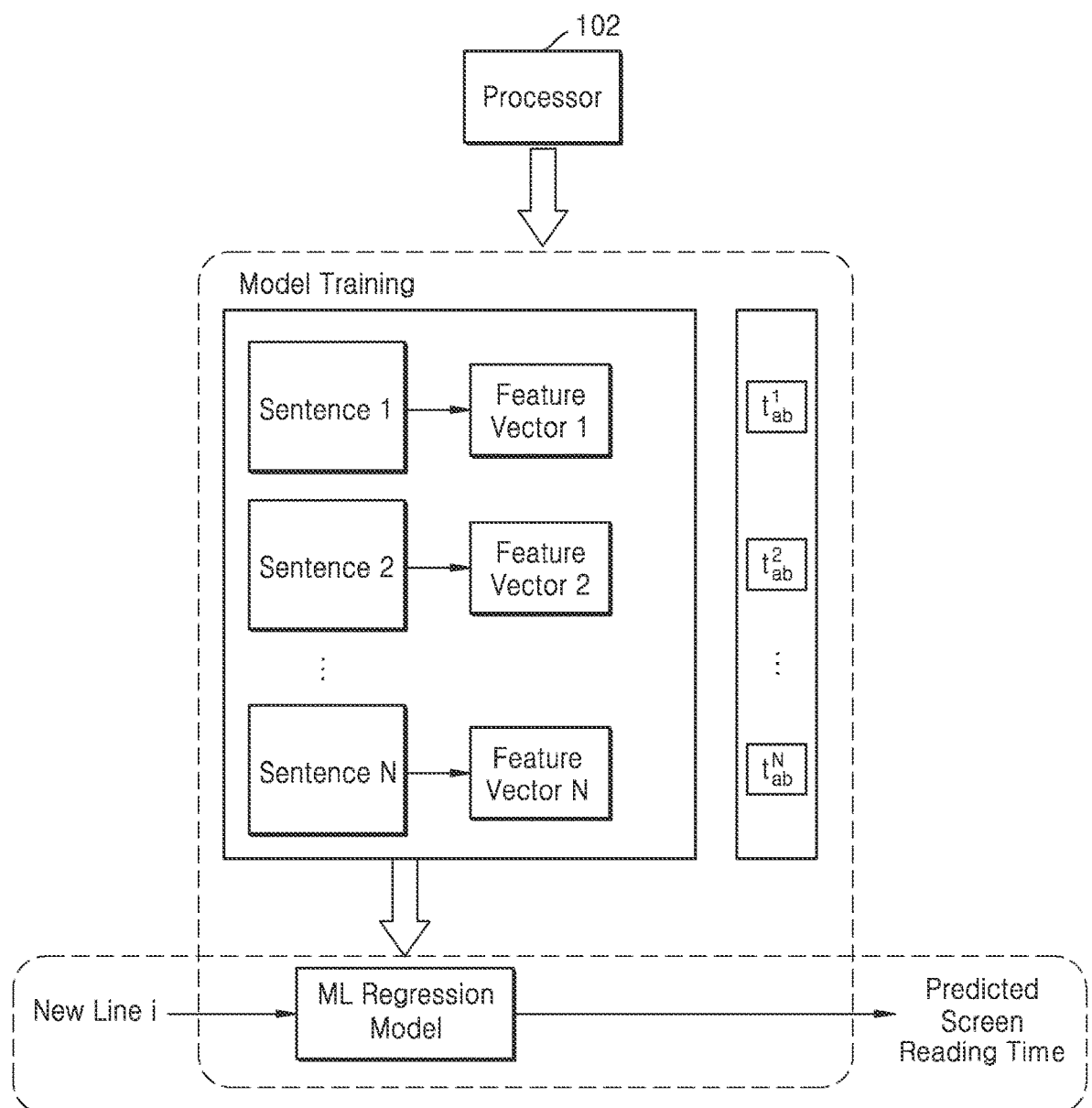
FIG. 1I is a block diagram illustrating training of the data item reading time prediction for the data file utilizing the third training dataset by the processor 102 associated with the electronic device 100, according to an embodiment of the disclosure.

FIG. 1I is a block diagram illustrating training of the data item reading time prediction for the data file utilizing the third training dataset by the processor 102 associated with the electronic device 100, according to an embodiment of the disclosure.

The processor 102 is used to predict an amount of time for which a user spends on a particular block of data item such as a line or sentence displayed on the display 106. The processor 102 determines the actual data item reading time or the time for reading each data item and maps the actual data item reading time to the determined feature vectors as conducted for determining screen reading time and scroll distance prediction, which in turn utilized to train the third ML regression model to predict or determine a block reading time or a sentence reading time or a line reading time. The output of the data item reading time prediction performed by the processor 102 can further be utilized for providing smart subtitles while playing videos on the electronic device 100.

In an embodiment, to the processor 102 detects the degree of user distraction while the user reads the contents or the data items of the data file on the display 106.

A user may get tired of reading while he or she is reading the data on the display 106 of the electronic device 100 for a long period of time. After sufficient training of the first and the second ML regression model, the complete screen reading time may be accurately predicted. The processor 102 then compares the output i.e. the predicted complete screen reading time and the actual complete screen reading time of the user spent for reading the data item of the current screen of the display 106 over a predetermined period of time. Based on the comparison, it is determined that a continuous increase (deviation) of the actual complete screen reading time compared to the predicted complete screen reading time by a gap—a predetermined value. The deviation, in an embodiment, may indicate that the user is distracted from reading in two consecutive times. In addition, the continuous increase—for more than three times, for example, of the actual complete screen reading time indicates that the user is distracted. In an embodiment, the processor 102 compares the predicted scroll distance with the actual scroll distance to determine whether the skimming of the data items or pages or screens presented through the electronic device 100 occurs. The output of the comparison is utilized for determining the degree of fatigue or distraction of the user and for properly scheduling a pop-up of the advertisements or warning notifications to the users through the electronic device 100 based on the degree of the distraction of the user. The warning notification may include a warning to cease reading the data item and to take a break for a while.

Figure 1J:
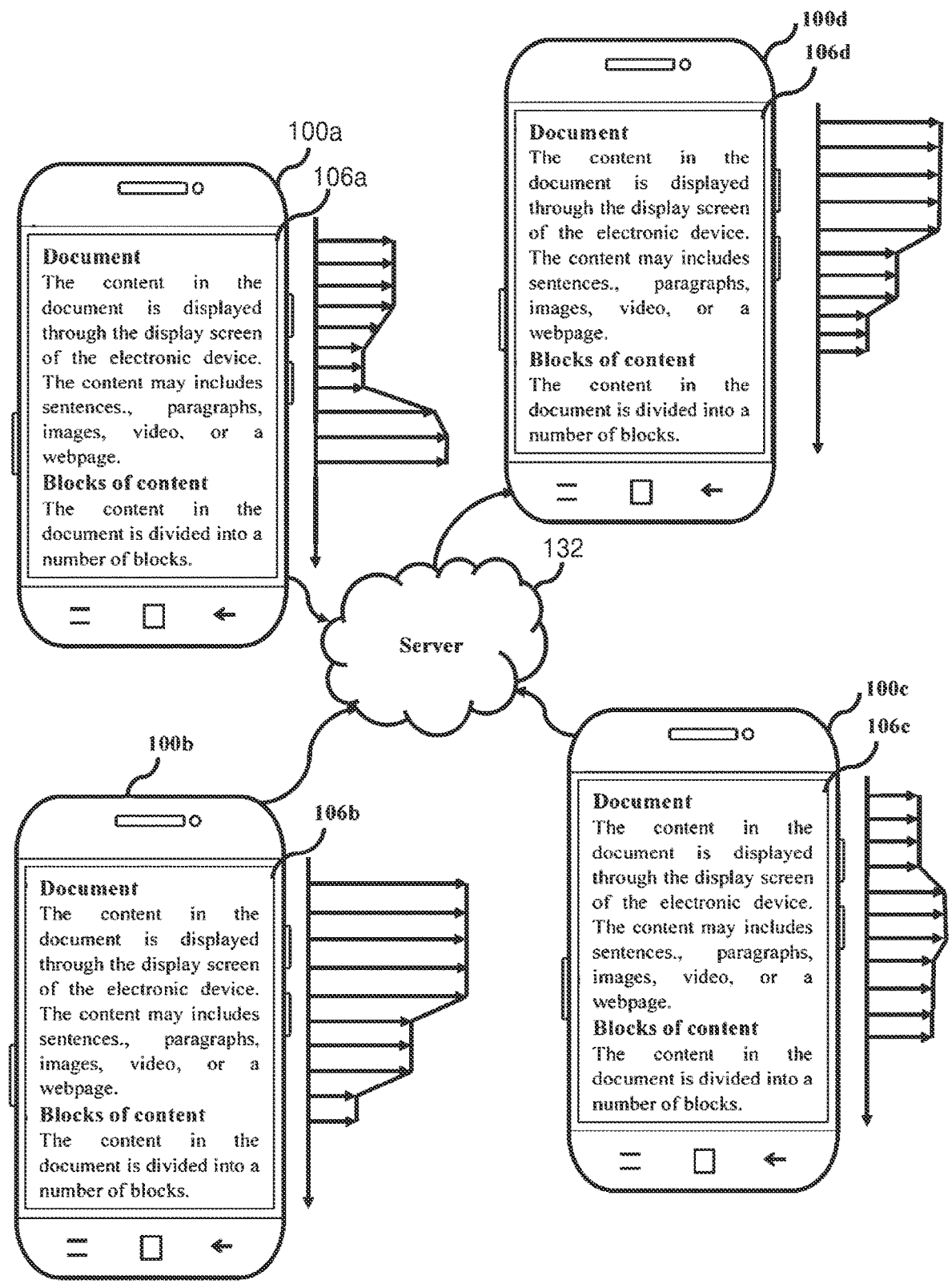
FIG. 1J illustrates an operation of collecting the data item reading time sequences of a plurality of users for a variety of data items presented through the screens 106a, 106b, 106c, and 106d of the respective electronic devices 100a, 100b, 100c, etc., according to an embodiment of the disclosure.

FIG. 1J illustrates an operation of collecting the data item reading time sequences of a plurality of users for a variety of data items presented through the screens 106a, 106b, 106c, and 106d of the respective electronic devices 100a, 100b, 100c, and 100d, according to an embodiment of the disclosure.

The individual user reading data including reading parameters is shared to a server 132 by multiple users through a network. In an embodiment, the processor 102 of the electronic device 100 or the server 132 is configured to enable collecting the data item reading time sequences of a plurality of users for a variety of data items presented through the screens 106a, 106b, 106c, and 106d of the respective electronic devices 100a, 100b, 100c, and 100d. The data item reading time sequences may represent a collection of the data item reading time spent for a particular data item among a plurality of users.

The processor 102 or the server 132 collects the actual data item reading time for a variety of contents or data items and store the actual data item reading time for the variety of contents or data items in the server 132. The server 132 store, for the plurality of users, the actual data item reading time of each of the user based on the type and content of data item. When a user starts reading a particular data item, the processor 102 retrieves a global data item reading time sequence for the particular data item and presented to the user through a graphical user interface (GUI) on the display 106 of the electronic device 100. The global data item reading time sequence for the particular data item may be a series of an average reading time for each of data items collected from the plurality of the users. That is to say, the data item reading sequences of the plurality of the users for a document are combined to form a global data item reading time sequence for the particular document.

The processor 102 of the electronic device 100 continuously collects each user's reading parameters for analyzing and further visualizing various metrics through a dedicated dynamic GUI in the electronic device 100. The processor 102 collects data from the user's actual reading content or data item and data from various other components and stores them in the memory 104. The collected data are categorized and presented through the dynamic GUI on the display 106 of the electronic device 100. The dynamic GUI provides information including new words encountered, meaning of non-frequent words, predicted and actual reading time over a certain period of time such as a week, a month, an hour etc., to enable the users to evaluate an improvement of predicting various reading parameters such as a complete screen reading time, a partial screen reading time, a scroll distance per one scrolling action, or a data reading time. Further, the processor 102 enables the users to share the collected information with other users through social media or other platforms. In an embodiment, the global data item reading time sequence for the one or more data items is utilized, by the electronic device 100 or the server 132, for determining a popularity level for each of the portions of the one or more data items. The popularity level for each of the portions of the one or more data items is further utilized, by the electronic device 100, to highlight the portions of the data items displayed on the display 106 using at least one visual indicator.

Figure 1K:
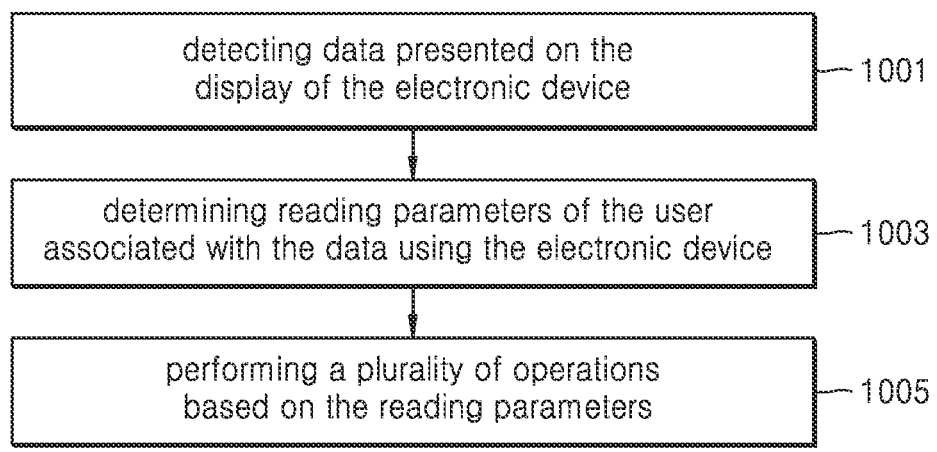
FIG. 1K illustrates a flowchart of managing operations on data presented on the display 106, according to an embodiment of the disclosure

FIG. 1K illustrates a flowchart of managing operations on data presented on the display 106, according to an embodiment of the disclosure.

In operation 1001, the processor 102 detects data (data items in a data file) presented on the display 106 of the electronic device 100.

In operation 1003, the processor 102 determines reading parameters of the user associated with the data using the electronic device 100.

In operation 1005, the processor 102 performs a plurality of operations based on the reading parameters. In an embodiment, the reading parameters may include a complete screen reading time taken by the user to completely read the data presented on the display 106 of the electronic device 100, a partial screen reading time taken by the user to read at least one portion of the data, a scroll distance per one scrolling action on the display 106, or a data reading time which is a time taken to completely read the data presented on the display 106. The data reading time may differ from the complete screen reading time when the data is presented on a partial portion of the display 106 of the electronic device 100. A partial screen reading time may be a time taken to read a portion of the data when the screen is divided into a plurality of blocks. The plurality of blocks may be divided uniformly.

Figure 2:
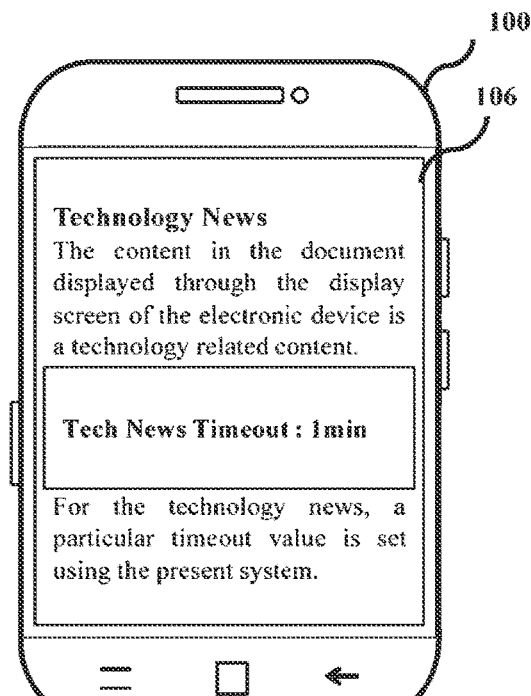
FIG. 2 illustrates exemplary use case to determine the dynamic screen timeout as one of reading parameters, according to an embodiment of the disclosure.
Figure 2:
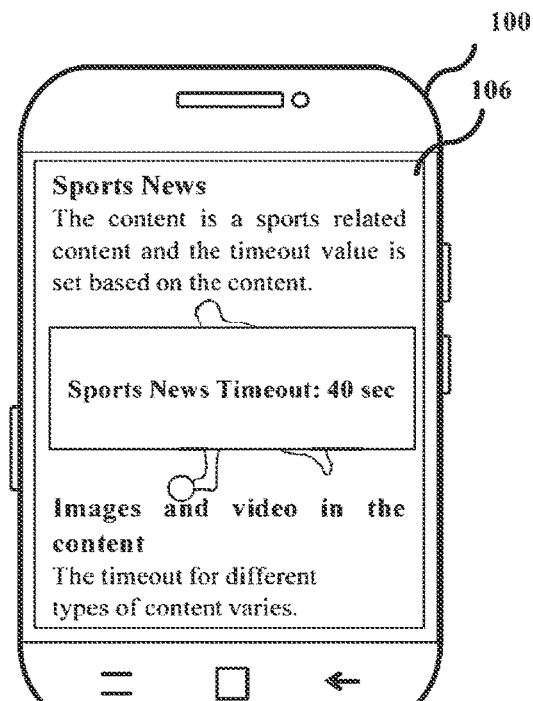
Figure 2:
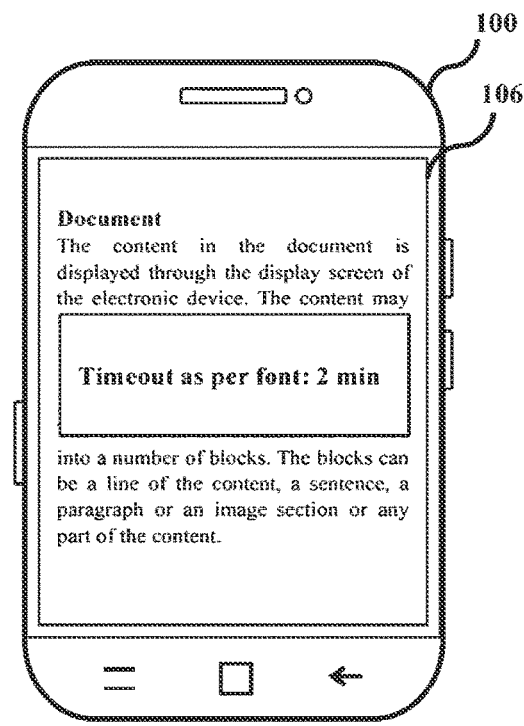
Figure 2:
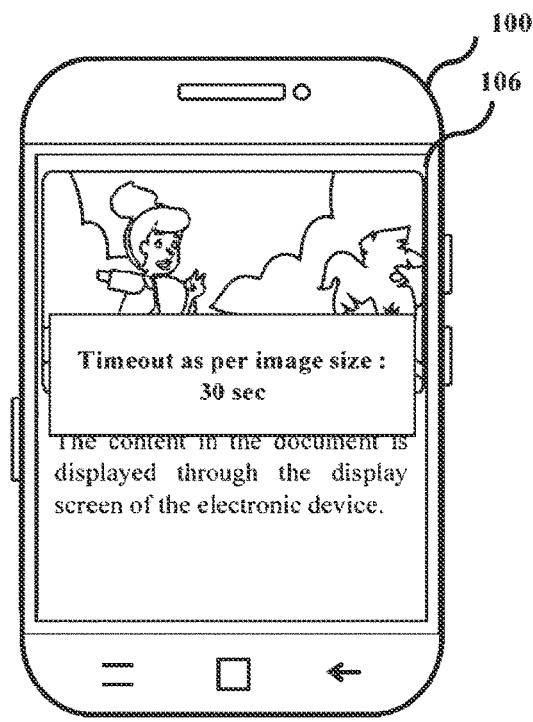

FIG. 2 illustrates exemplary use case to determine the dynamic screen timeout as one of reading parameters, according to an embodiment of the disclosure.

The predicted reading parameters including the predicted complete screen reading time taken by the user to completely read the data items displayed on the display 106 of the electronic device 100 by the processor 102 is utilized to determine the dynamic screen timeout on the electronic device 100 while the user reads the data items on the display 106 of the electronic device 100. The dynamic screen timeout also depends on the screen content or the content of the data items presented through the display 106 of the electronic device 100 and the relation of the user with the content and the amount of time the user spends on the data item presented on the display 106 before scrolling ahead automatically is calculated using a supervised machine learning by the processor 102. The screen may be changed to display a next page including a different portion of the data items after the lapse of the dynamic screen timeout. For example, if the portion of the data item is related to a certain technology, the dynamic screen timeout is automatically set by the electronic device 100 as 1 minute because the content related to certain technology may require more time to read through as shown in (a) of FIG. 2. If certain portion of the data item is related to a sports content, the dynamic screen timeout is automatically set by the electronic device 100 as 40 seconds as shown in (b) of FIG. 2. Further, the electronic device 100 sets the dynamic screen timeout based on the type and size of the font in the display 106, according to an embodiment. For example, the smaller the font size is, the longer is the dynamic screen timeout. For example, if the font size is very small, the user reading time also increases and the dynamic screen timeout is automatically set by the electronic device 100 to 2 minutes as shown in (c) of FIG. 2. Further, electronic device 100 sets the dynamic screen timeout based on the size and count of images presented on the display 106. For example, if the size of the images on the screen is large as shown in (d) of FIG. 2, then the amount of text content or data items is minimal and the dynamic screen timeout is automatically decreased and set by the electronic device 100 to 30 seconds. The dynamic screen timeout saves the battery and prevents unwanted interruptions to the user while reading certain portion of the data items on the display 106 of the electronic device 100.

Figure 3:
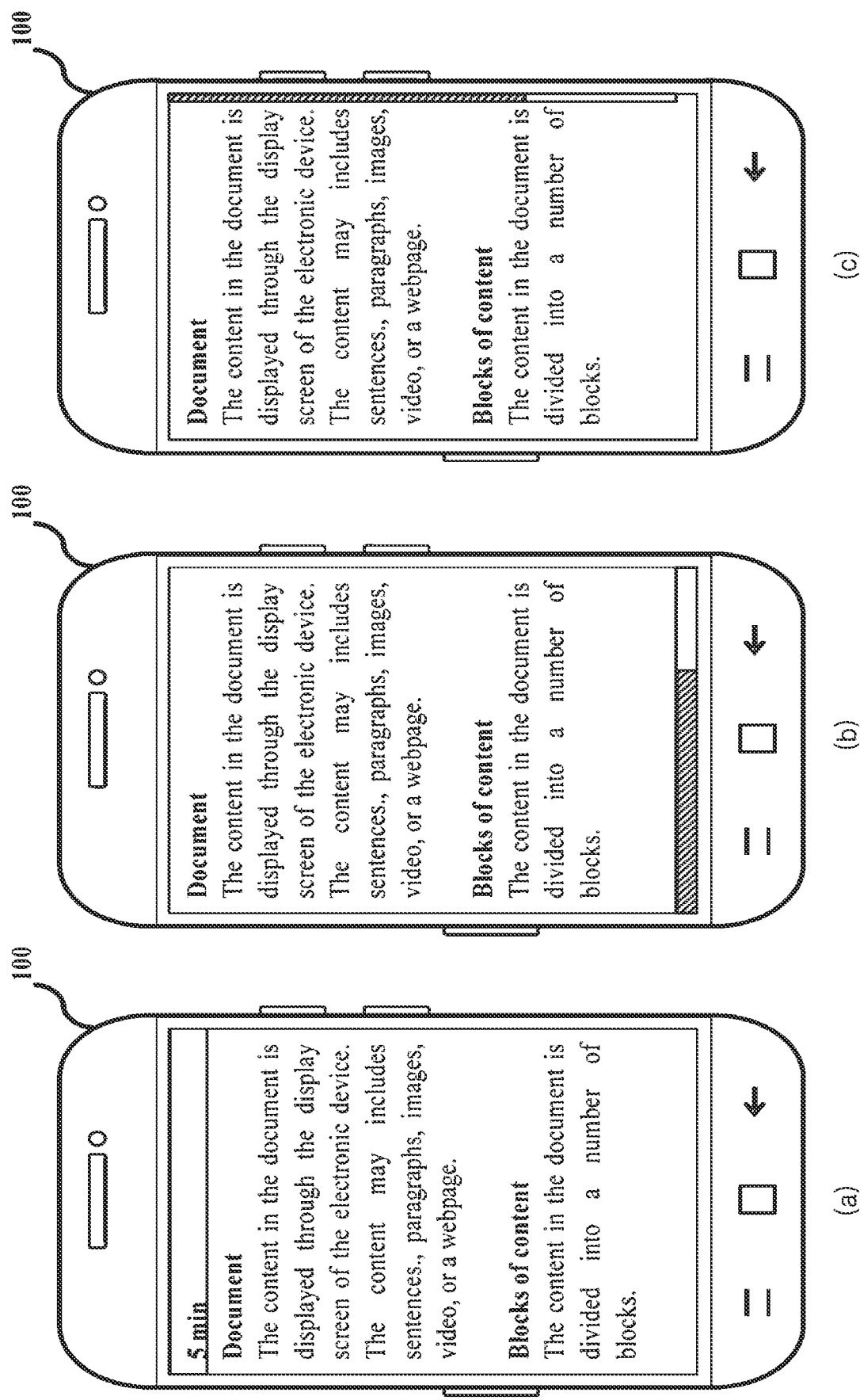
FIG. 3 illustrates an example of utilizing the predicted complete screen reading time to automatically determine the dynamic screen timeout and presenting the dynamic screen timeout on the electronic device 100, according to an embodiment of the disclosure.

FIG. 3 illustrates a use case of utilizing the predicted complete screen reading time to automatically determine the dynamic screen timeout and presenting the dynamic screen timeout on the electronic device 100, according to an embodiment of the disclosure.

The dynamic screen timeout can be presented through the GUI of the electronic device 100. When the user reads the data items on the display 106, the remaining time, e.g. 5 minutes for the dynamic screen timeout as shown in (a) of FIG. 3 is displayed. In an embodiment, a graphic indicator such as a dynamic horizontal progress bar that dynamically presents the time left for reading the whole data item presented on the display 106 of the electronic device 100 as shown in (b) of FIG. 3. In an embodiment, a dynamic vertical progress bar that dynamically presents the time left for reading the whole data item presented on the display 106 of the electronic device 100 is displayed as shown in (c) of FIG. 3.

Figure 4A:
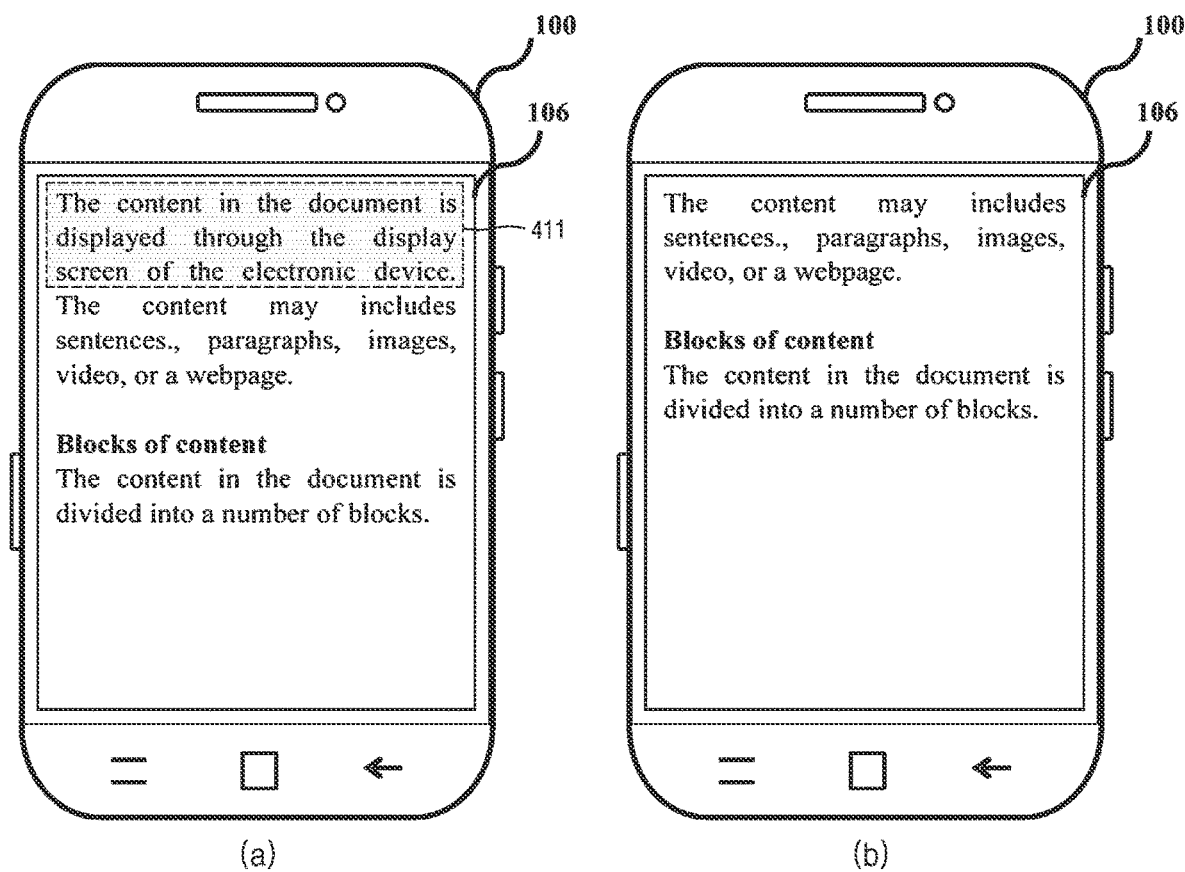
FIG. 4A and FIG. 4B illustrate an example of indicating an auto scroll on the display 106 of the electronic device 100, according to an embodiment of the disclosure.
Figure 4B:
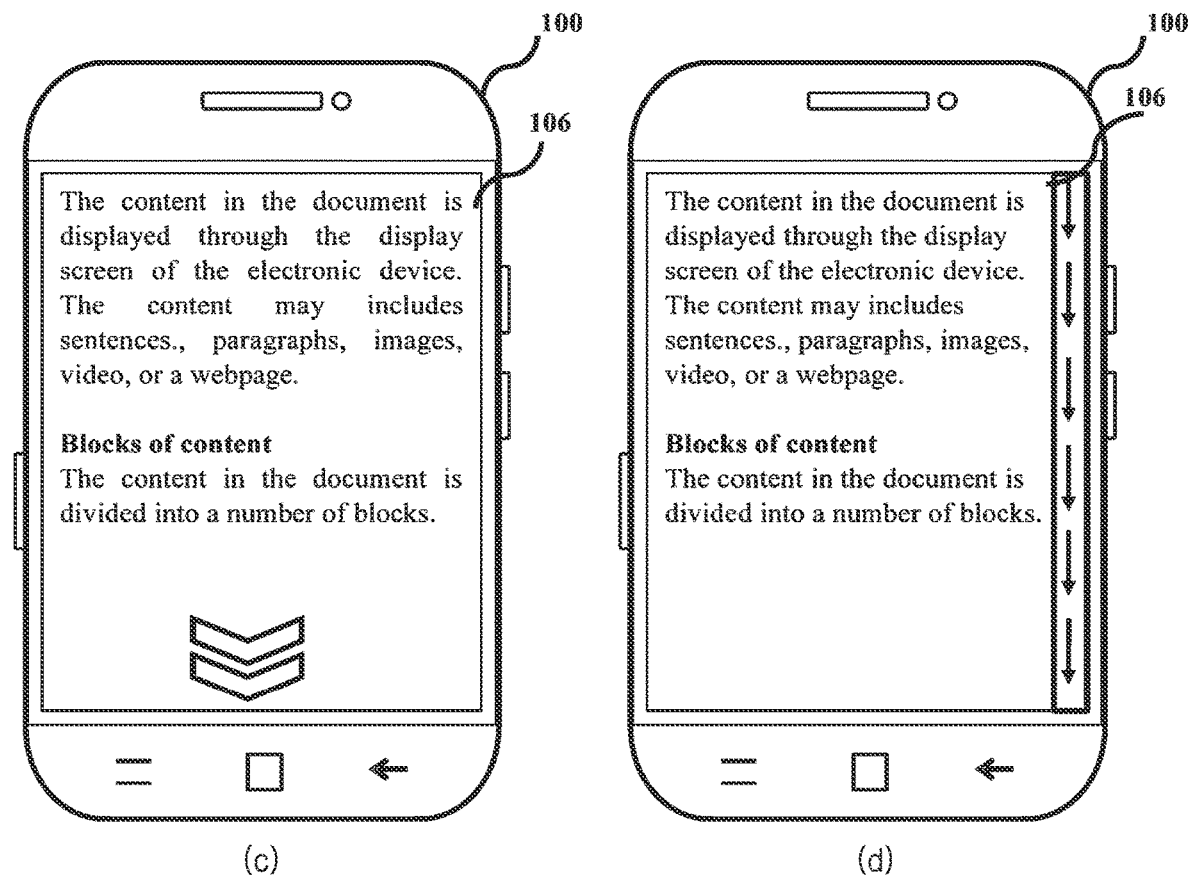

FIG. 4A and FIG. 4B illustrates a use case of indicating an auto scroll on the display 106 of the electronic device 100, according to an embodiment of the disclosure.

In (a) and (b) of FIG. 4A, the GUI of the electronic device 100 highlights or changes the text color or transparency of the portion of the data items on the display 106 as a graphic indication to the user that the highlighted portion is going to be automatically scrolled up or scrolled out within a predetermined time.

In (c) and (d) of FIG. 4B, the GUI of the electronic device 100 indicates to the user in form of animations at the bottom or as an edge progress bar that the auto scrolling is going to be performed by the electronic device 100. In an embodiment, the animations or arrows changes in color depending upon the time left for next auto scroll on the display 106 of the electronic device 100. For example, the color of the animation becomes darker as the time left for the next auto scroll becomes smaller in (c) of FIG. 4. In another example, the arrow moves toward the bottom of a vertical side or an edge of the display 106 as the time left for the next auto scroll becomes smaller in (d) of FIG. 4. The edge of the display may be feature screens that curve around one or both edge of the electronic device 100.

Figure 5:
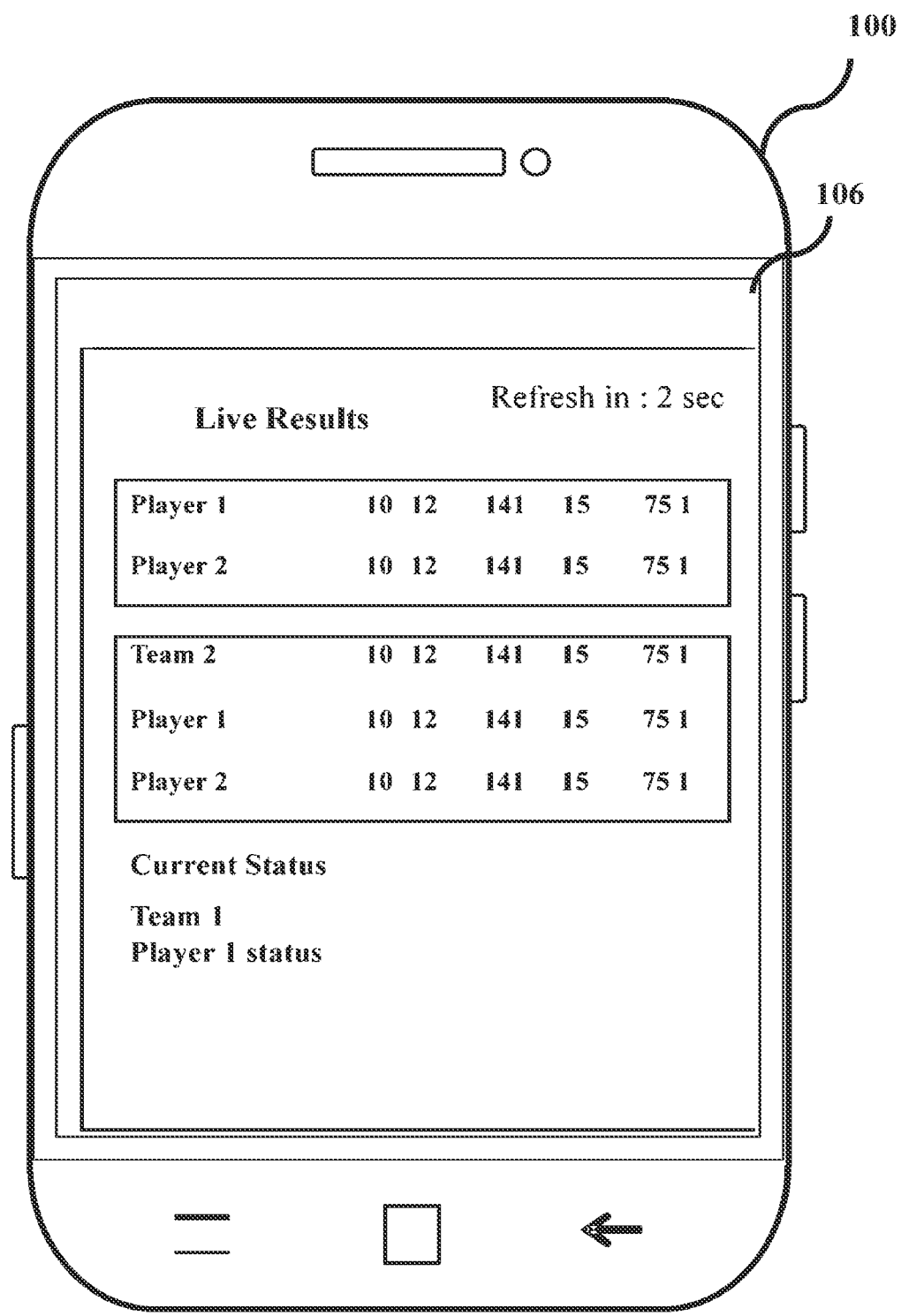
FIG. 5 illustrates an example of dynamic content refresh rate on the data items presented through the display 106 of the electronic device 100, according to an embodiment of the disclosure.

FIG. 5 illustrates an example of dynamic content refresh rate on the data items presented through the display 106 of the electronic device 100, according to an embodiment of the disclosure.

The output from the screen reading time prediction is used for determining the content refresh rate for the content or the data items presented through the display 106 of the electronic device 100. If the display 106 is displaying a dynamically updating content such as the score of a sports match as shown in FIG. 5, the content refresh rate in the display 106 is dynamically adjusted by the processor 102 based on the screen reading time determined using the complete screen reading time determined by the processor 102. In some instances, the content refresh rate in the display 106 is dynamically adjusted by the processor 102 based on the data item reading time which is determined as the time for reading a data item or content in the display 106. Upon expiration of the predicted data item reading time, the content is automatically refreshed by the processor 102.

Further, the electronic device 100 continually monitors the reading parameters of the user and compares with the predicted reading parameters. In case, the electronic device 100 detects a deviation in the predicted reading parameters such as the predicted scroll distance of the user by comparing the reading parameters including an actual scroll distance of the user and the predicted scroll distance, the processor 102 automatically adjusts the amount of the auto scroll distance to provide better reading experience to the user.

Figure 6:
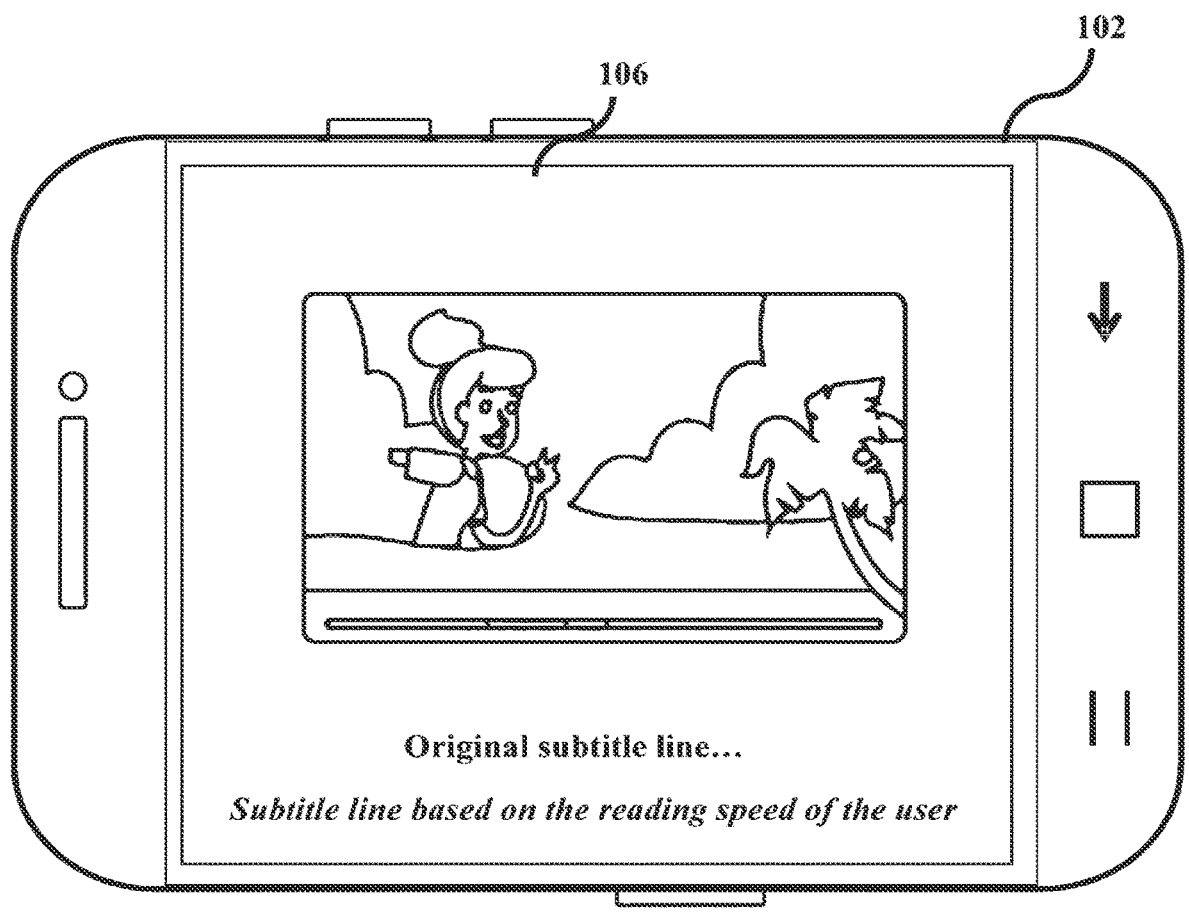
FIG. 6 illustrates an example of providing smart subtitles on the data including video content, according to an embodiment of the disclosure.

FIG. 6 illustrates an example of providing smart subtitles on the data including video content, according to an embodiment of the disclosure.

Based on the data item reading time determined by the processor 102 based on the trained third ML regression model, the electronic device 100 adjusts the subtitles on the video content that is being reproduced through the display 106 of the electronic device 102. In certain instances, the subtitles based on the predicted data item reading time of the user may be presented in a different color or font size or font type to the user through the screen of the electronic device 100. In some other instances, the processor 102 may control the amount of the subtitles displayed along with the video content being played on the display 106 of the electronic device 100 based on the predicted data item reading time to avoid, for example, blocking of the video image by the subtitles. The longer the predicted data item reading time is, the smaller is the amount of the subtitle to be displayed with the video content.

Another exemplary case of using the data item reading time based on the trained third ML regression model, is in standardized tests performed using the electronic device 100. The data item reading time of the user for each problem in the test is calculated using the processor 102 and total reading time of all problems is added in the total test time limit. This provides extra time to the users with reading disabilities while participating in the standardized tests using the electronic device 100. For example, the total time for solving a problem in the test includes problem reading time and problem solving time. The present method takes into account the reading disabilities of the user and the problem reading time for the users with reading disabilities differs from that of other users participating in the standardized tests using the electronic devices 100. However, the problem solving time for all the users attending the standardized tests using the electronic device 100 remains the same.

Figure 7:
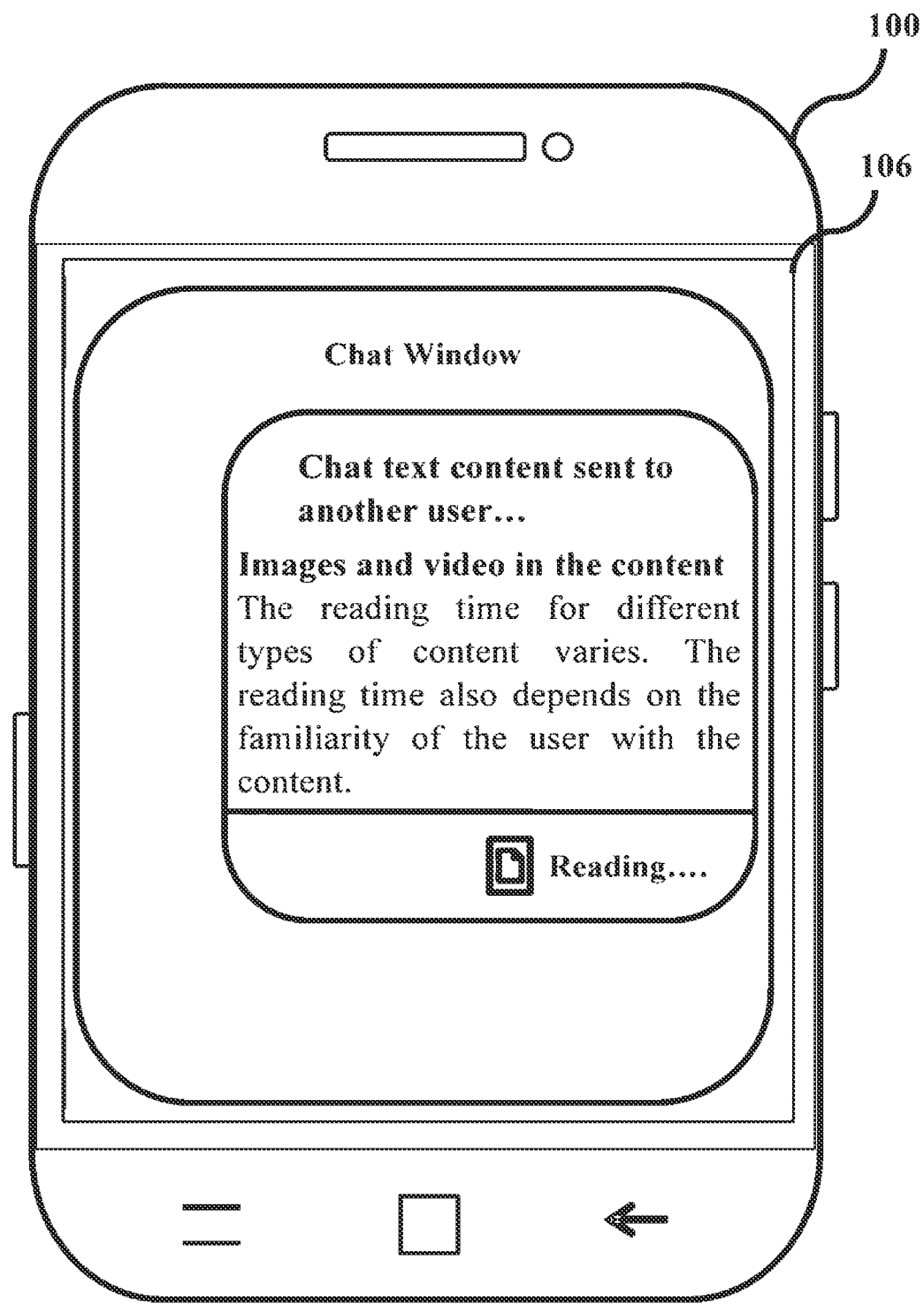
FIG. 7 illustrates an example of providing a timestamp while presenting data items through the display of the electronic device, according to an embodiment of the disclosure.

FIG. 7 illustrates an example of providing a timestamp while presenting data items through the display of the electronic device, according to an embodiment of the disclosure.

When a user sends one or more data items as a text message to another user using the electronic device 100, the processor in the receiving device determines the predicted reading time for reading the text message and sends the predicted reading time of the receiving device to the electronic device 100 which transmitted the text message. Based on the predicted reading time of the receiving device, a reading timestamp or a read timestamp is presented through the GUI of the electronic device 100.

Figure 8:
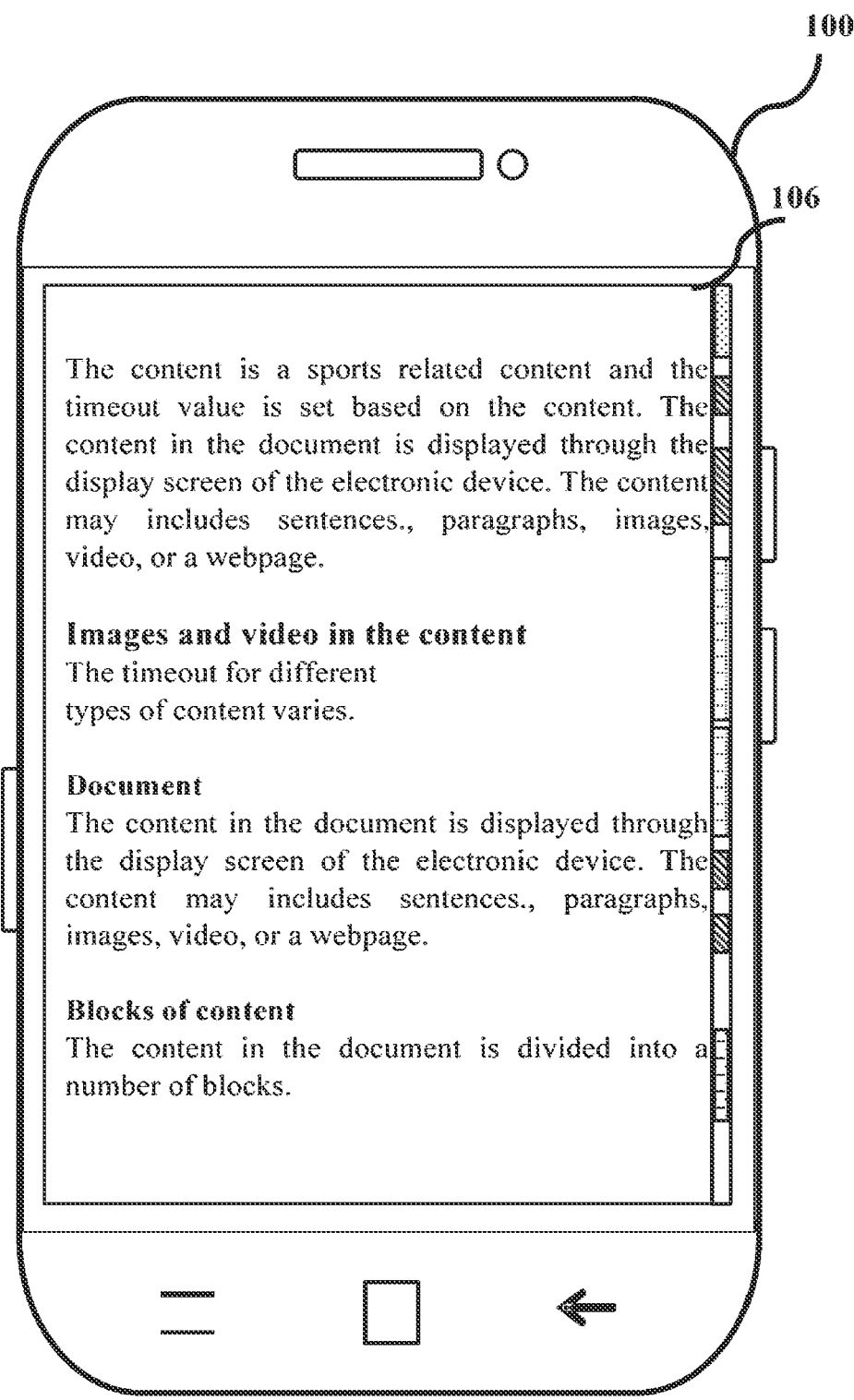
FIG. 8 illustrates an example of identifying a popular block among the data items, according to an embodiment of the disclosure.

FIG. 8 illustrates an example of identifying a popular block among the data items, according to an embodiment of the disclosure.

The total time taken for reading each of the data item presented on the display 106 for each user is collected by the processor 102 or shared with the server 132. The server 104 calculates or estimates the reading time for each block of the data item and classifies each block having a portion of data items based on the reading time. The server 132 compares the reading time for each block having a portion of the data items with a threshold value for each block and classifies each block into 'high', 'medium' or 'low' reading time category. The category of 'high' reading time may represent the high importance of the block among the data items. The category may be divided into more specifically such as 1 (lowest) to 5 (highest). In an embodiment, the threshold value may be an average reading time for a particular block of the data items calculated based on globally collected reading time for the particular bloci. When a user accesses the particular block of the data items, the electronic device 100 presents visual indications for various blocks to enable the user to have a quick overview of the data items and to skip the visually indicated unimportant blocks of data items.

Figure 9:
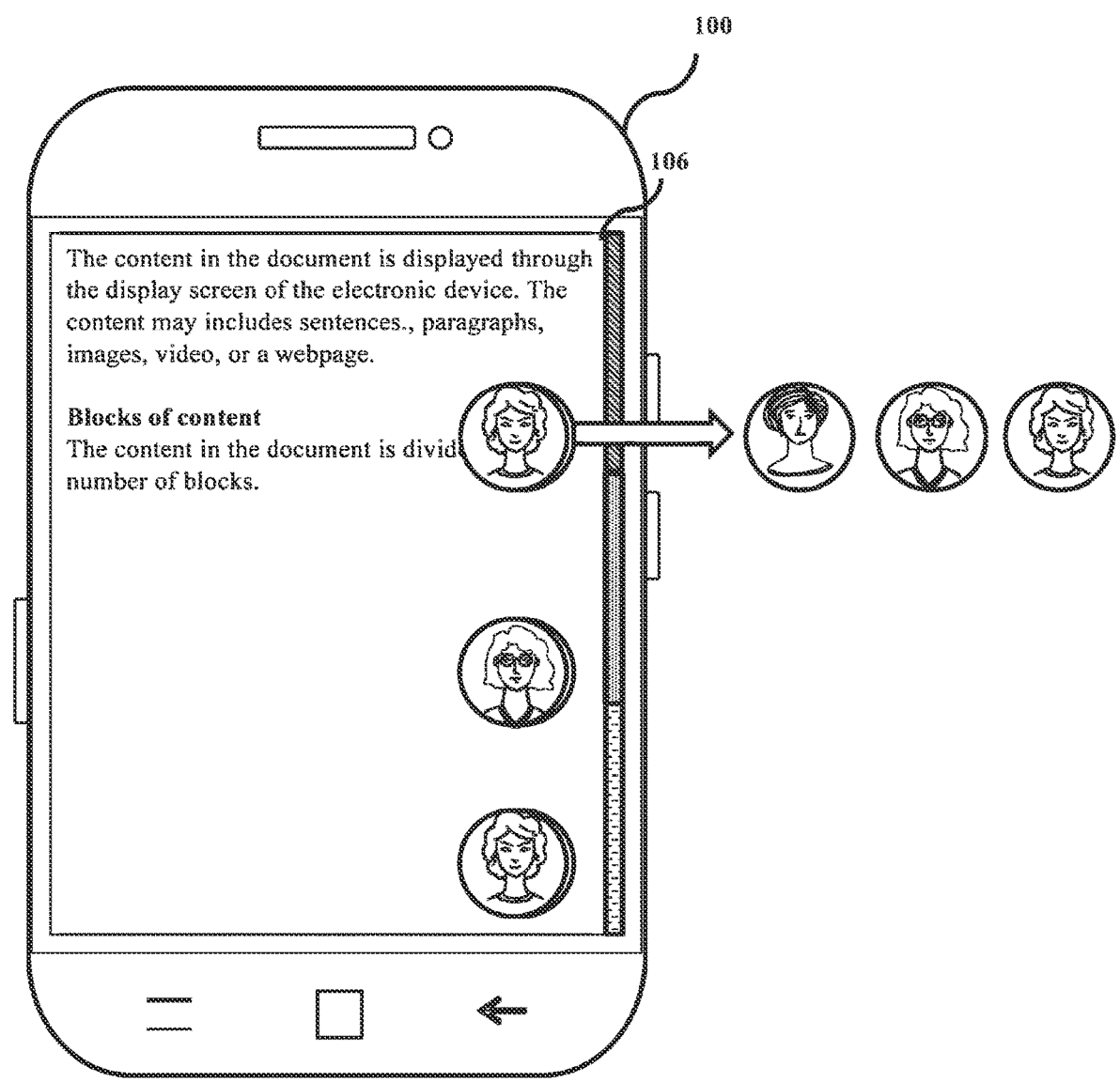
FIG. 9 illustrates an example of suggesting other users in the corpus for discussing on the data items presented through the display 106 of the electronic device 100, according to an embodiment of the disclosure.

FIG. 9 illustrates an example of suggesting other users in the corpus for discussing on the data items presented through the display 106 of the electronic device 100, according to an embodiment of the disclosure.

In an embodiment, if the user is reading the data item or a paragraph among the data items, the other users who have spent high time to this particular paragraph based on the reading time collected globally in the server 132 are suggested to the user for discussion on this particular paragraph. In an embodiment, the server 132 suggests the users who previously connected or accessed the particular paragraph or the data item. The suggested users may be selected from social media friends of the user. In an embodiment, the server 132 suggests any other user with matching or substantially matching at least one of reading parameters to that of the user. In an embodiment, a graphic identification (e.g. face image or chat head) of the suggested users may be displayed on or in the vicinity of the particular paragraph presented on the display 106 referring to FIG. 9. In an embodiment, the graphic identification may be displayed on an edge portion of the electronic device 100 corresponding to the particular paragraph presented on the display 106. The user can touch the suggested chat head and an unrolled list of friends appears to start conversation regarding the particular paragraph of the data items presented through the display 106. The particular paragraphs may correspond to a particular block in reference to FIG. 8.

Figure 10:
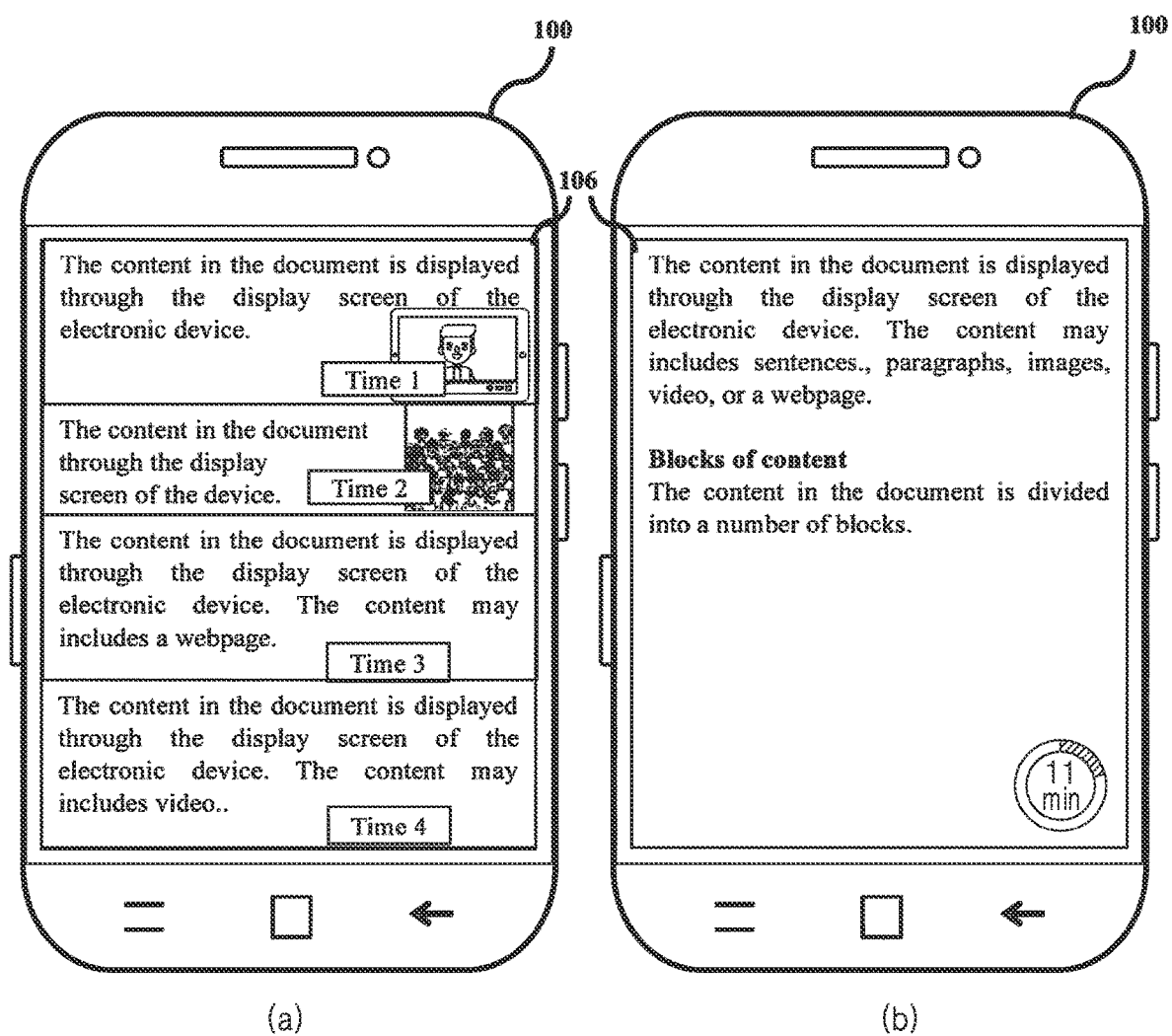
FIG. 10 illustrates an example of presenting an estimated reading time of each data file or the data items in the data file presented through the display 106 of the electronic device 100, according to an embodiment of the disclosure.

FIG. 10 illustrates an example of presenting an estimated reading time of each data file or the data items in the data file presented through the display 106 of the electronic device 100, according to an embodiment of the disclosure.

The server 132 stores the total time taken by various users for reading the data items in a particular data file. The actual total time taken for reading the data items in the particular data file is determined using the processor 102. From the received actual total time taken for reading the data items, the server 132 determines an estimated reading time for the data items in the data file and global data item reading time for the particular data items is then determined by collecting data item reading time of various users. The estimated reading time for the data items in the data file is then presented through the GUI of the electronic device as in shown in (a) of FIG. 10. In one embodiment, the animation corresponding to estimated time left to finish reading the particular portion of data items in the data file is presented through the display 106 of the electronic device 100 when the user reads the data file, as shown in (b) of FIG. 10.

Figure 11A:
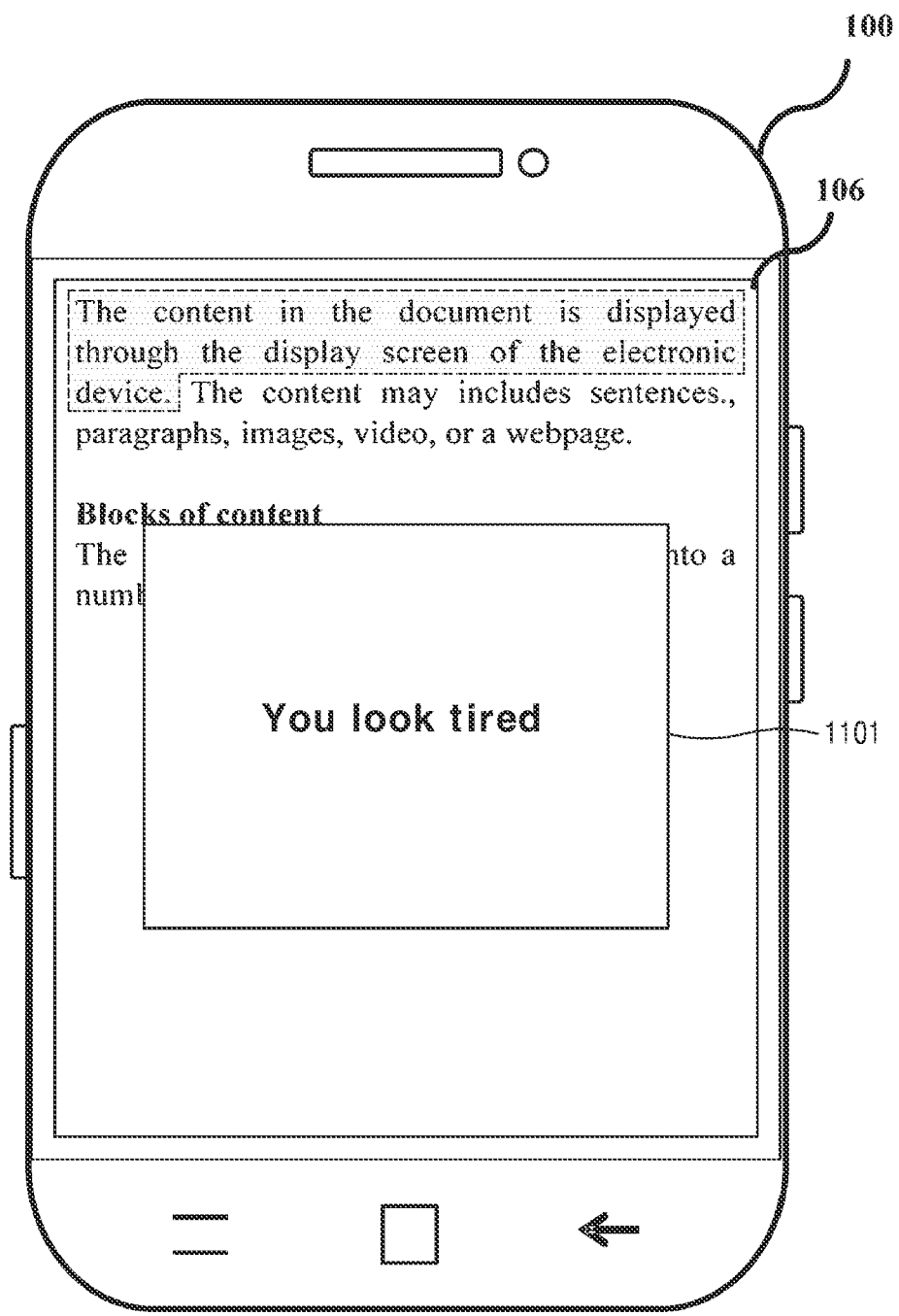
FIG. 11A illustrates an example of presenting a message indicating distraction or fatigue of the user through the display 106 of the electronic device 100, according to an embodiment of the disclosure.
Figure 11B:
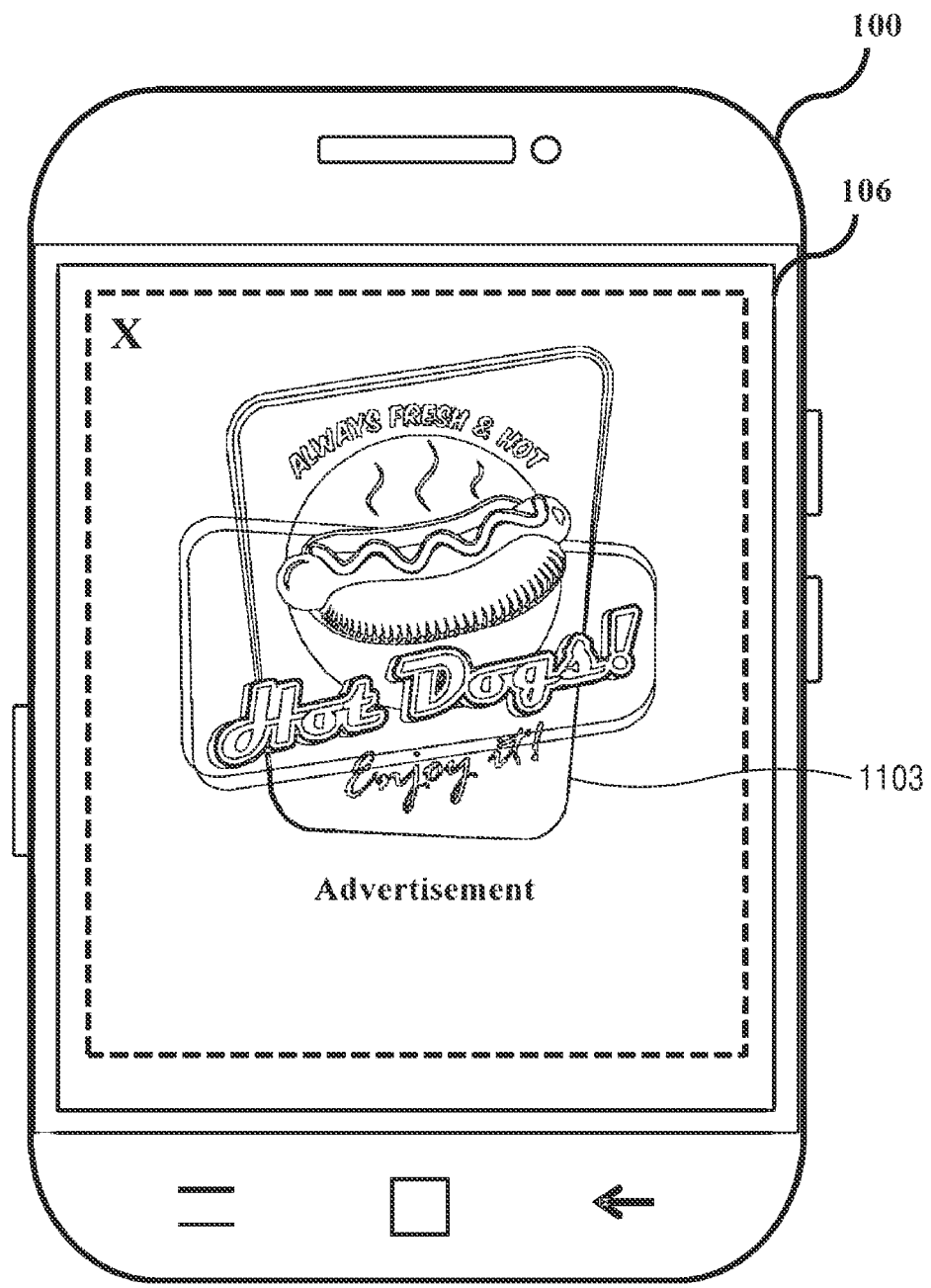
FIG. 11B illustrates an example of presenting an advertisement when a distraction or fatigue of the user exceeds a predetermined value, according to an embodiment of the disclosure.

FIG. 11A illustrates an example of presenting a message indicating distraction or fatigue of the user through the display 106 of the electronic device 100, according to an embodiment of the disclosure.

The user distraction degree while reading the data items in the display 106 of the electronic device 100 is determined by detecting the actual reading parameters of the user, i.e. the actual complete screen reading time and actual scroll distance for the at least one data item and identifying a deviation from the predicted reading parameters of the user, i.e. the predicted complete screen reading time and predicted scroll distance, for the at least one data item by comparing the actual reading parameters of the user and the predicted reading parameters of the user. Upon determining that the deviation is above a predetermined value, the electronic device 102 is configured to output the message or notifications 1101 indicative of the deviation to the user. Further, the processor 102 of the electronic device 100 presents one or more advertisements 1103 through the display 106 following the message or notification or instead of the message or notifications referring to FIG. 11B.

Further, the degree of the user distraction is used for determining a time to place a notification on the electronic device 100, according to an embodiment. If the degree of the user distraction indicates that the user distraction level is high while reading the one or more data items on the display 106 of the electronic device 100, then the electronic device 100 automatically delays the received notifications on the electronic device 100. In another example, the notifications are delayed until the user finishes reading the current sentence or block of the data items in the display 106 determined by the processor 102. In another example, the user can pre-set a delay time by which the notifications can be delayed while the user reads the data items on the display 106 of the electronic device 100.

Figure 12:
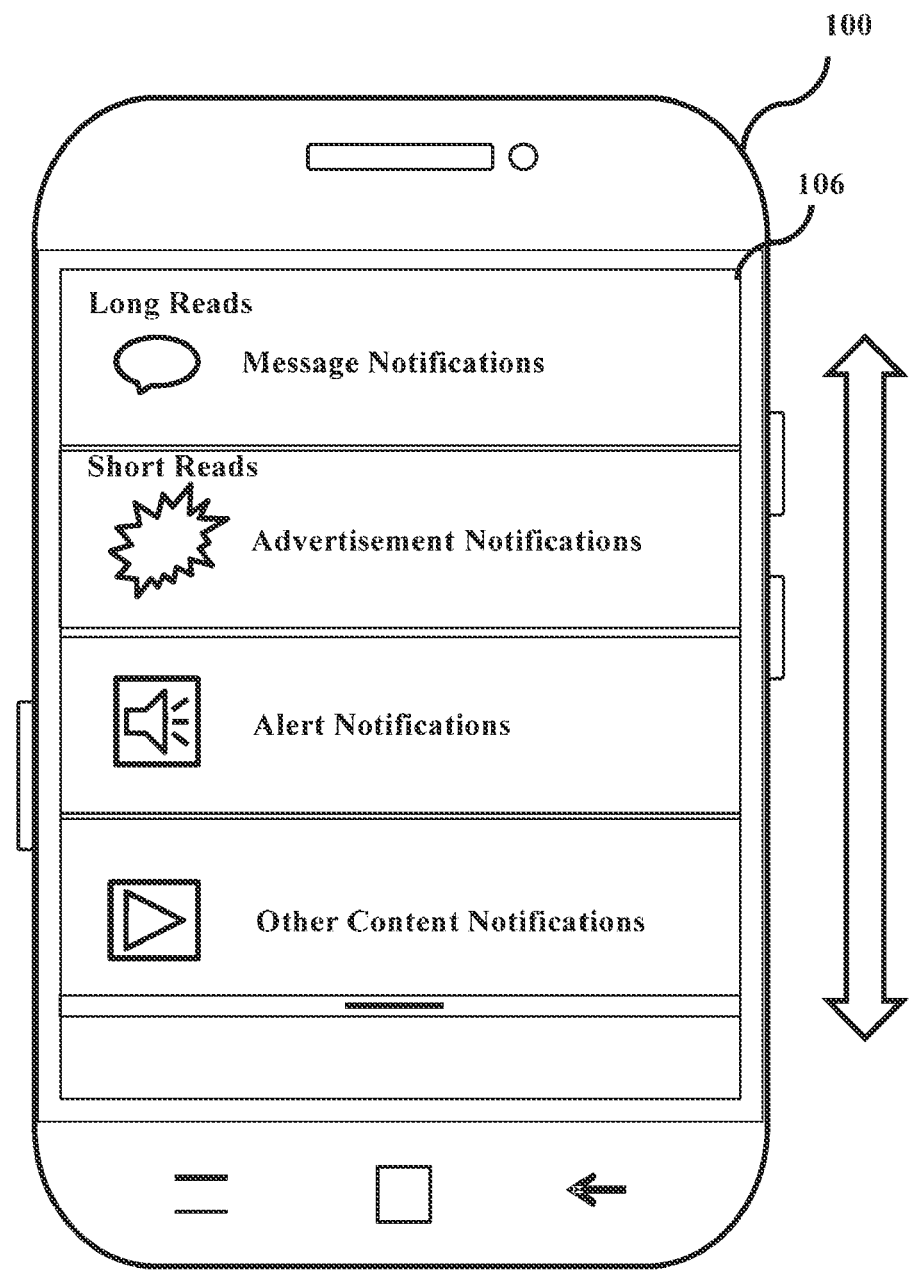
FIG. 12 illustrates categorizing the notifications of the electronic device 100, according to an embodiment of the disclosure.

FIG. 12 illustrates categorizing the notifications of the electronic device 100, according to an embodiment of the disclosure.

The notifications received on the electronic device 100 can be sorted or categorized based on the predicted time for the user to read the notifications. For example, it will take more time to read text message notifications and email notifications than advertisements. In an embodiment, the link or source content of the notifications is opened in the background, based on the contents of the link the total reading time of the link is determined. The notifications on the electronic device 100 are arranged accordingly based on the reading time of the user associated with each of the notifications.

In another embodiment, the total reading time, new words encountered and their meaning, reading speed, content sources accessed are collected and shown through the GUI presented on the display 106 of the electronic device 100. Further, in some instances, the data from the processor 102 can be shared with other users to support each other in reading goals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for managing operations on data presented on a display of an electronic device, the method comprising:
    detecting data presented on a display of the electronic device;
    determining reading parameters associated with the data; and
    performing, by the electronic device, a plurality of operations based on the reading parameters,
    wherein the reading parameters comprise at least one of a complete screen reading time taken by a user to completely read the data presented on the display of the electronic device, a partial screen reading time taken by the user to read at least one portion of the data, a scroll distance per one scrolling action on the display, or a data reading time which is a time taken to completely read the data presented on the display, and
    wherein the plurality of operations include displaying a graphic indication indicating a portion of the data to be scrolled out within a predetermined time,
    wherein the determining of the reading parameters are performed based a plurality of machine learning (ML) regression models, and
    wherein the plurality of ML regression models are trained by:
        dividing a screen of the display of the electronic device into a plurality of blocks;
        extracting features of the data for each of the plurality of blocks;
        generating a first training dataset comprising an actual time taken to completely read the data presented on the display, the extracted features per each of the plurality of blocks, and a context of the data;
        generating a second training dataset comprising an actual scroll distance, the extracted features per each of the plurality of blocks, and the context of the data;
        training a first ML regression model from the plurality of ML regression models using the first training set to determine the complete screen reading time; and
        training a second ML regression model from the plurality of ML regression models using the second training dataset to determine the scroll distance per one scrolling action.

2. The method of claim 1, further comprising determining the complete screen reading time and the partial screen reading time based on at least one of a font size, a size of the display, or a space size between words, lines, or paragraphs.

3. The method of claim 1, further comprising:
    determining a context of the data,
    wherein the determining of the reading parameters is performed based on the context of the data.

4. The method of claim 3, wherein the determining of the context of the data comprises determining the context of the data based on at least one of content of the data, a type of the content of the data, a familiarity by the user with the content, a state of the electronic device, a scrolling pattern of the user, a reading proficiency of the user, time of detecting the data, or a location of the electronic device.

5. The method of claim 1, further comprising determining the complete screen reading time based on the trained first ML regression model,
    wherein the plurality of operations include adjusting a screen timeout time for the data presented on the display of the electronic device.

6. The method of claim 1, further comprising determining the scroll distance per one scrolling action based on the trained second ML regression model,
    wherein the plurality of operations include performing a scroll the display based on the determined scroll distance per one scrolling action.

7. The method of claim 1, wherein the dividing of the screen of the display into the plurality of blocks comprises uniformly dividing the screen of the display into the plurality of blocks.

8. The method of claim 7, further comprising:
    determining a visual focus distribution based on the plurality of blocks;
    assigning an actual complete screen reading time to each of the plurality of blocks, wherein the actual complete screen reading time indicates a time taken by the user to completely read the data on the display; and
    determining an actual data item reading time for each of the plurality of blocks based on the assigned actual complete screen reading time to each of the plurality of blocks.

9. The method of claim 8, wherein the determining of the visual focus distribution is based on a pattern of weights of a plurality of block level layers of a trained machine learning regression model.

10. The method of claim 1, further comprising:
    determining an actual complete screen reading time for at least one portion of the data over a predetermined time period; and comparing a predicted complete screen reading time for the at least one portion of the data and the actual complete screen reading time for the at least one portion of the data, wherein the plurality of operations include providing an advertisement based on a result of the comparison.

11. The method of claim 1, wherein the plurality of operations include displaying a graphic indicator indicating a progress of reading the data presented on the display of the electronic device.

12. The method of claim 1, further comprising:
receiving the data as a text message from another electronic device; and
transmitting, to the other electronic device, the data reading time for the data as the text message, the data reading time being displayed on a display of the other electronic device.

13. The method of claim 1, further comprising:
uniformly dividing a screen of the display of the electronic device into a plurality of blocks;
estimating a block reading time for each of the plurality of blocks based on reading times for the plurality of blocks collected from a plurality of users; and
classifying each of the plurality of blocks into various levels of importance based on the estimated block reading time,
wherein the plurality of operations include displaying a different visual indication for each of the plurality of blocks based on a level of the importance.

14. The method of claim 1, wherein the plurality of operations include displaying an identification of other users in a vicinity of a portion of the data or an edge corresponding to the portion of the data based on at least one of the reading parameters.

15. The method of claim 1, wherein the graphic indication indicates a direction of a scrolling action.

16. An apparatus for managing operations on data presented on a screen, the apparatus comprising:
a display configured to display the data;
a processor; and
memory carrying instructions which when executed cause the processor:
detect the data presented on the display,
determine reading parameters associated with the data, and
perform a plurality of operations based on the reading parameters,
wherein the reading parameters comprise at least one of a complete screen reading time taken by a user to completely read the data presented on the display of the apparatus, a partial screen reading time taken by the user to read at least one portion of the data, a scroll distance per one scrolling action on the display, or a data reading time which is a time taken to completely read the data presented on the display, and
wherein the plurality of operations include displaying a graphic indication indicating a portion of the data to be scrolled out within a predetermined time
wherein the determining of the reading parameters are performed based a plurality of machine learning (ML) regression models, and
wherein the plurality of ML regression models are trained by:
dividing a screen of the display of the apparatus into a plurality of blocks;
extracting features of the data for each of the plurality of blocks;
generating a first training dataset comprising an actual time taken to completely read the data presented on the display, the extracted features per each of the plurality of blocks, and a context of the data;
generating a second training dataset comprising an actual scroll distance, the extracted features per each of the plurality of blocks, and the context of the data;
training a first ML regression model from the plurality of ML regression models using the first training set to determine the complete screen reading time; and
training a second ML regression model from the plurality of ML regression models using the second training dataset to determine the scroll distance per one scrolling action.

17. The apparatus of claim 16, wherein the graphic indication indicates a direction of a scrolling action.

* * * * *